(12) United States Patent
Ronsen

(10) Patent No.: US 12,305,905 B2
(45) Date of Patent: May 20, 2025

(54) REFRIGERATED PORTABLE ROOM SYSTEM

(71) Applicant: Acela, Inc., Missoula, MT (US)

(72) Inventor: David Ronsen, Bozeman, MT (US)

( * ) Notice: Subject to any disclaimer, the term of this patent is extended or adjusted under 35 U.S.C. 154(b) by 165 days.

(21) Appl. No.: 18/238,379

(22) Filed: Aug. 25, 2023

(65) Prior Publication Data

US 2025/0067495 A1    Feb. 27, 2025

(51) Int. Cl.
*F25D 11/00* (2006.01)
*F25D 17/06* (2006.01)

(52) U.S. Cl.
CPC .............. *F25D 11/00* (2013.01); *F25D 17/06* (2013.01)

(58) Field of Classification Search
CPC ........ F25D 11/003; F25D 17/06; F25D 11/00; A61G 17/002
USPC .......................................................... 62/237
See application file for complete search history.

(56) References Cited

U.S. PATENT DOCUMENTS

| | | |
|---|---|---|
| 2,601,634 A | 6/1952 | Rivette |
| 3,392,497 A | 7/1968 | Cushmanm |
| 3,729,889 A | 5/1973 | Baruzzini |
| T104,002 I4 | 3/1984 | Morrison |
| 5,245,838 A | 9/1993 | Cavalaa, III |
| 6,244,063 B1 | 6/2001 | Yates |
| 8,621,877 B2 | 1/2014 | Tuszkiewicz |
| 9,555,921 B1 | 1/2017 | Cronin et al. |
| 9,939,188 B2 | 4/2018 | Lockwood |
| 10,619,907 B2 | 4/2020 | Kenneally |
| 10,731,910 B2 | 8/2020 | Lockwood |
| 2008/0256767 A1 | 10/2008 | Berns |
| 2008/0256878 A1 | 10/2008 | Berns |
| 2012/0096893 A1 | 4/2012 | Martin |
| 2012/0297794 A1 | 11/2012 | Tuszkiewicz |
| 2014/0345316 A1 | 11/2014 | Godbole et al. |
| 2015/0075208 A1 | 3/2015 | Lockwood |
| 2018/0224181 A1 | 8/2018 | Lockwood |
| 2018/0347887 A1 | 12/2018 | Kenneally |
| 2019/0142657 A1 | 5/2019 | Richardson |
| 2022/0354724 A1 * | 11/2022 | Richardson .......... A61G 17/002 |

* cited by examiner

Primary Examiner — Cassey D Bauer
(74) Attorney, Agent, or Firm — Antoinette M. Tease

(57) ABSTRACT

A refrigerated portable room system including a refrigerated room, air conditioning unit, insulated supply and exhaust hoses, and bumpers that are situated around the perimeter of the floor of the refrigerated room. The air conditioning unit supplies cooled air to the refrigerated room, which is sealed as to the exterior environment. The walls, floor and roof of the refrigerated room are comprised of two layers of a vinyl-coated polyester material with a continuous filament insulation batting contained between them. The inner structure is made up of modules, each module being comprised of a plurality of vertically aligned horizontal shelves that are connected by stackers and legs to form horizontal levels and aligned so as to form longitudinally oriented compartments. The front wall has a front flap for each horizontal level, and the front surface of each front flap has one or more windows that are configured to receive documents.

16 Claims, 18 Drawing Sheets

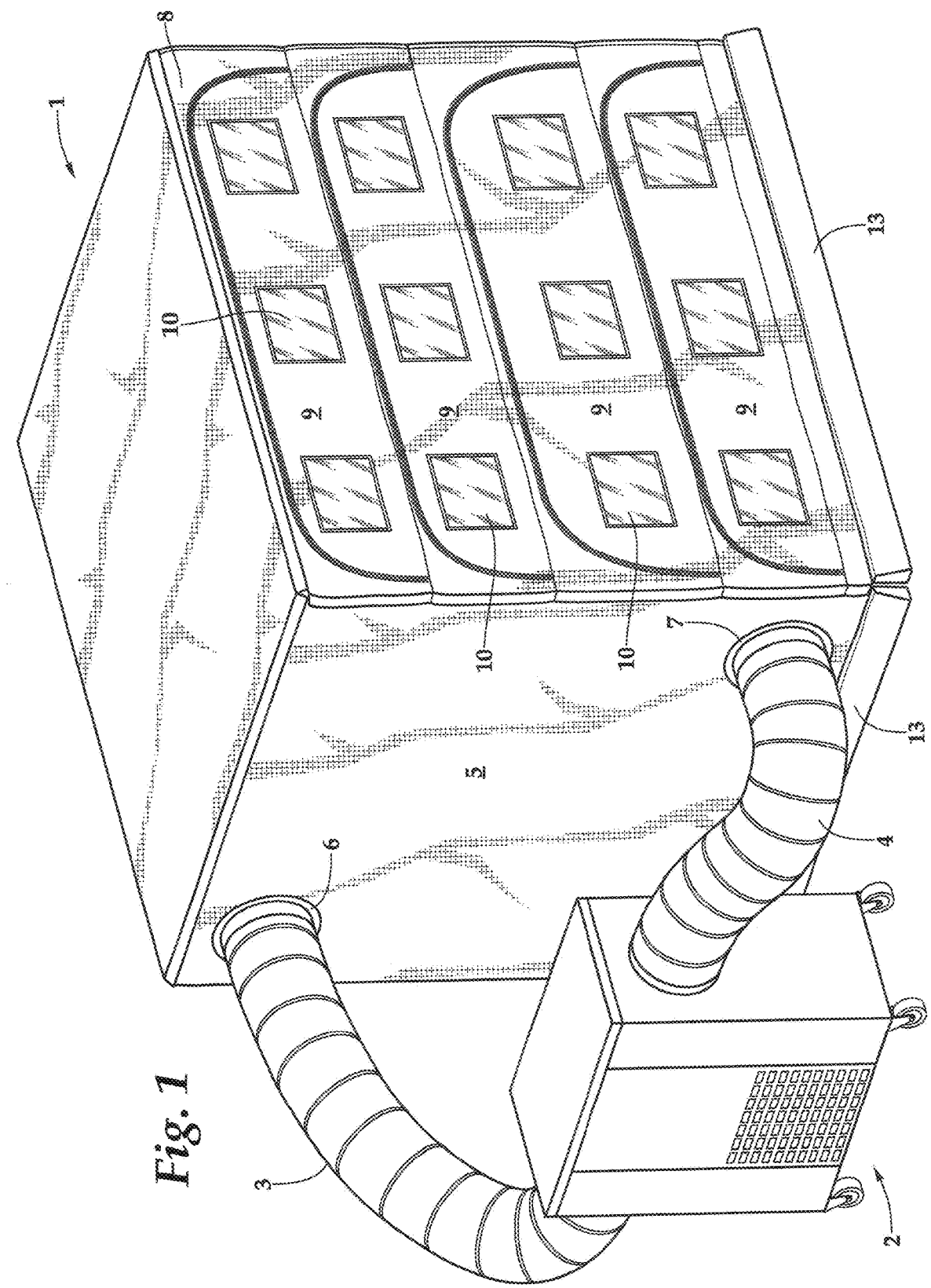

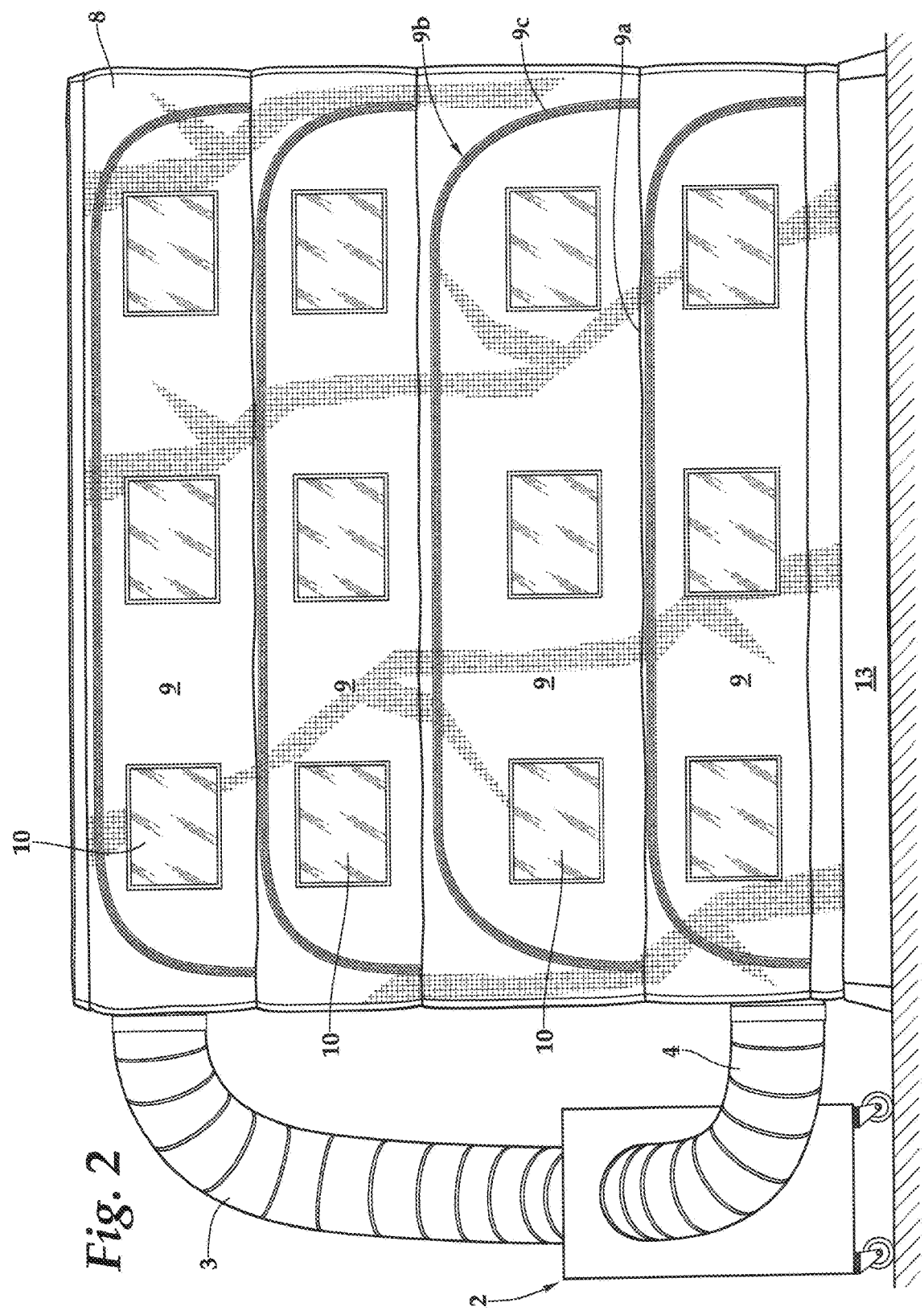

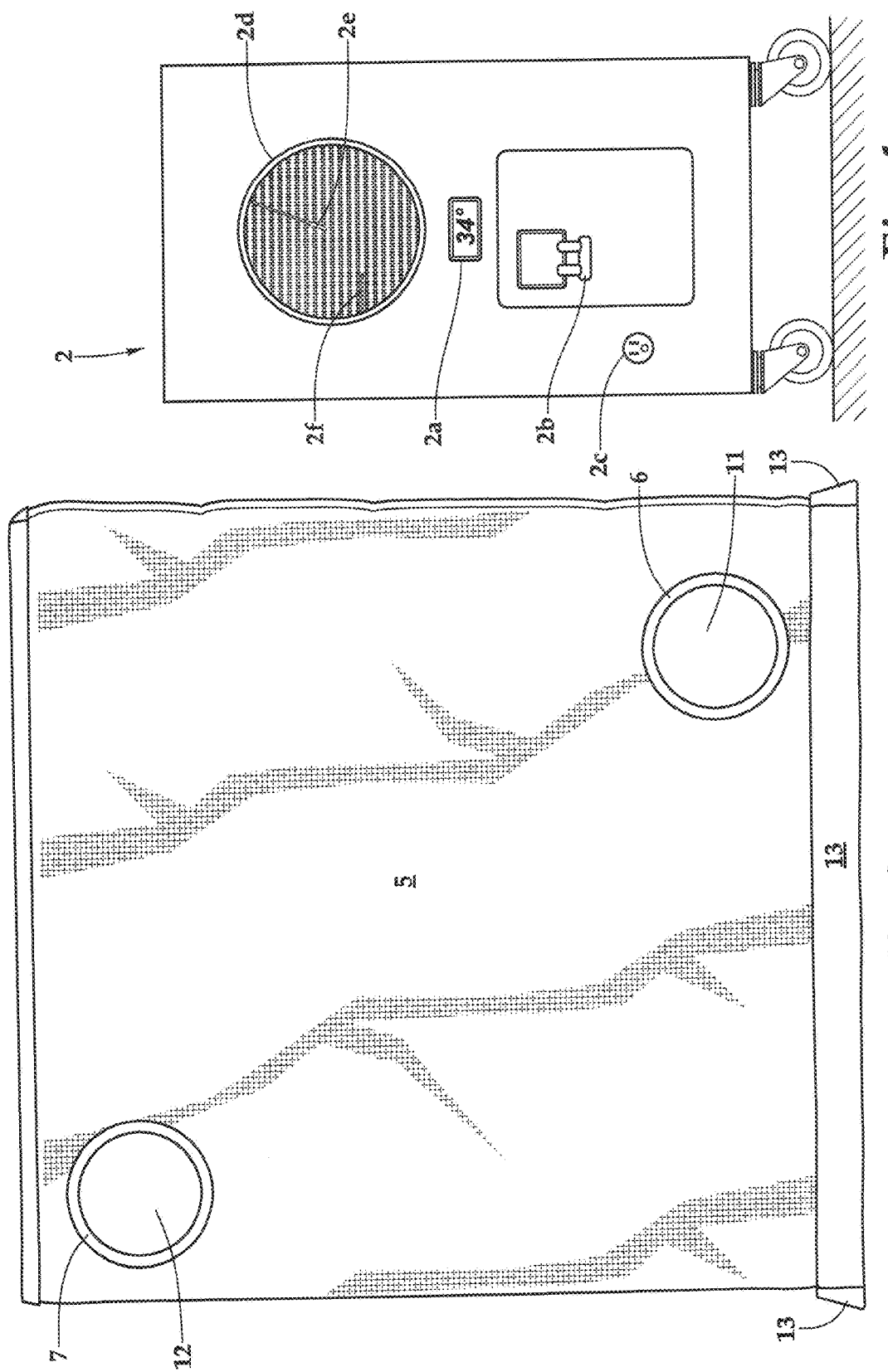

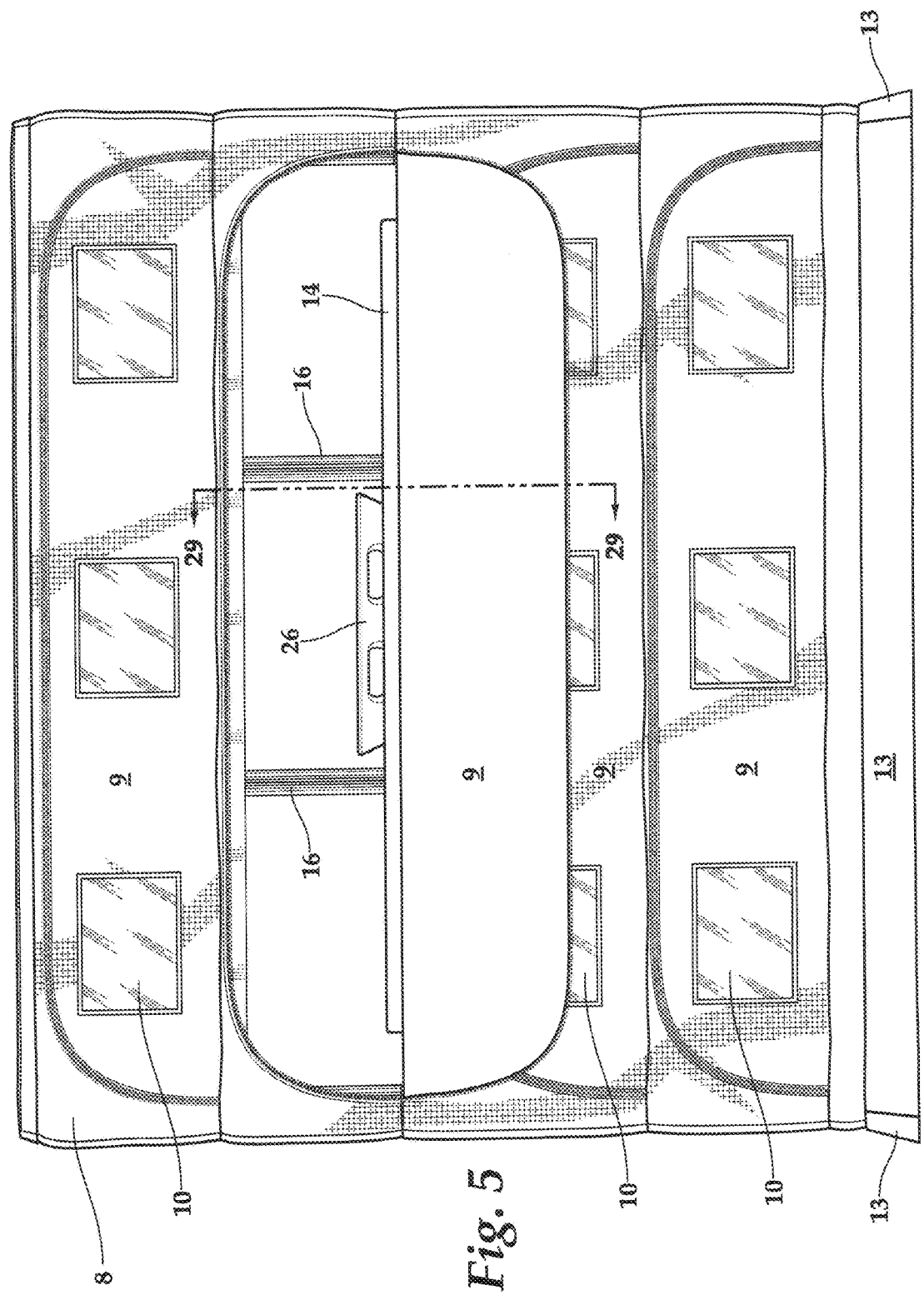

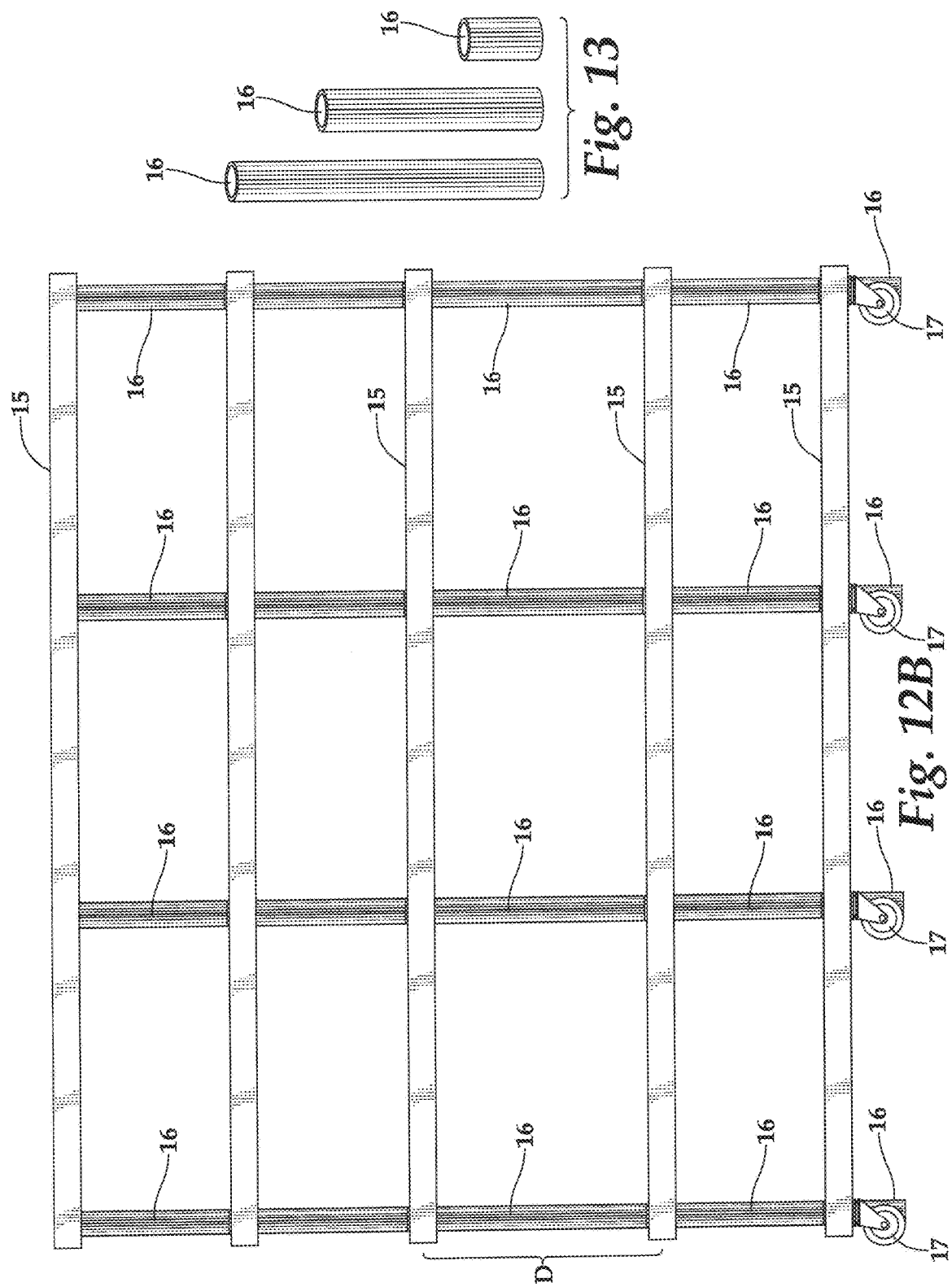

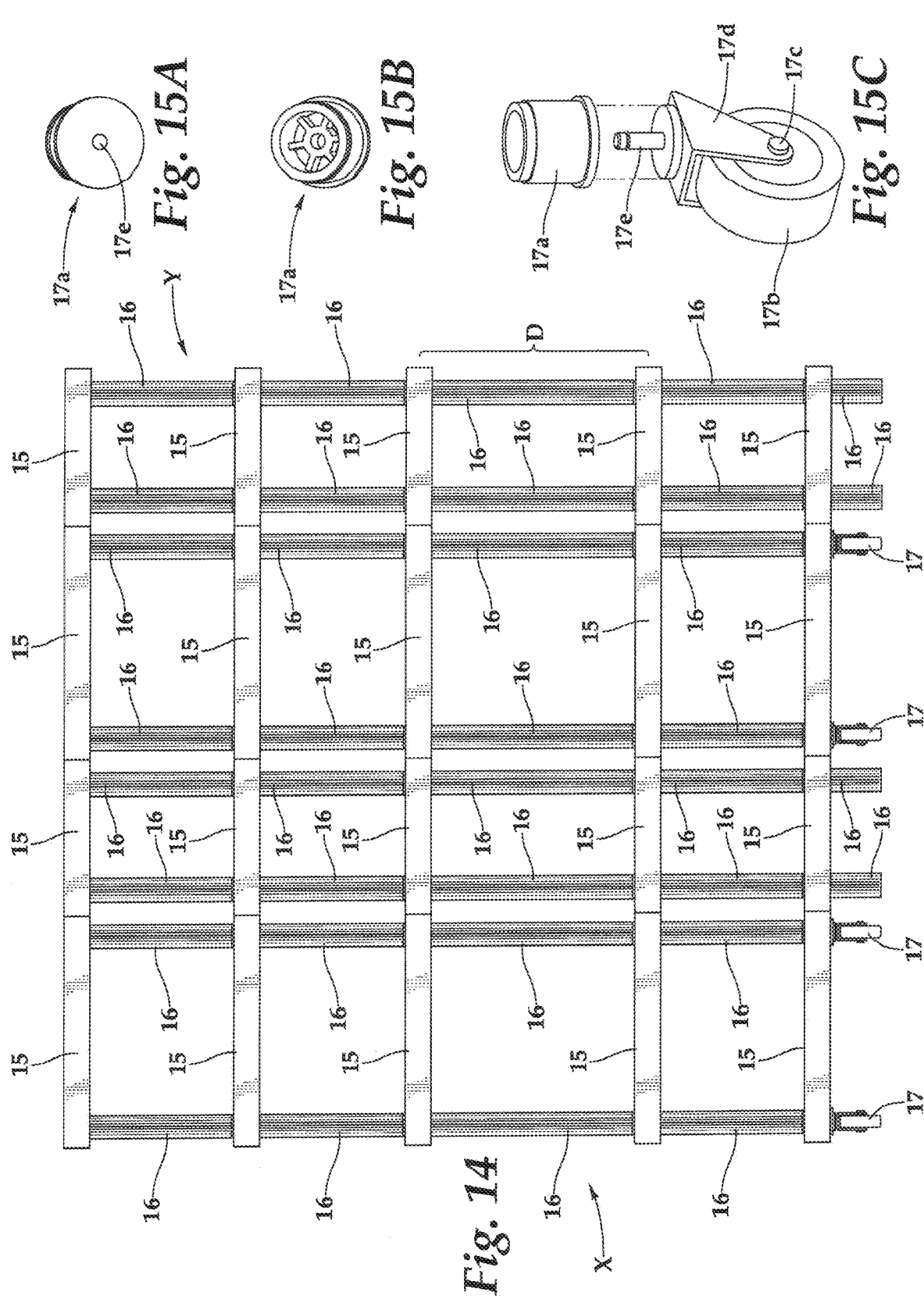

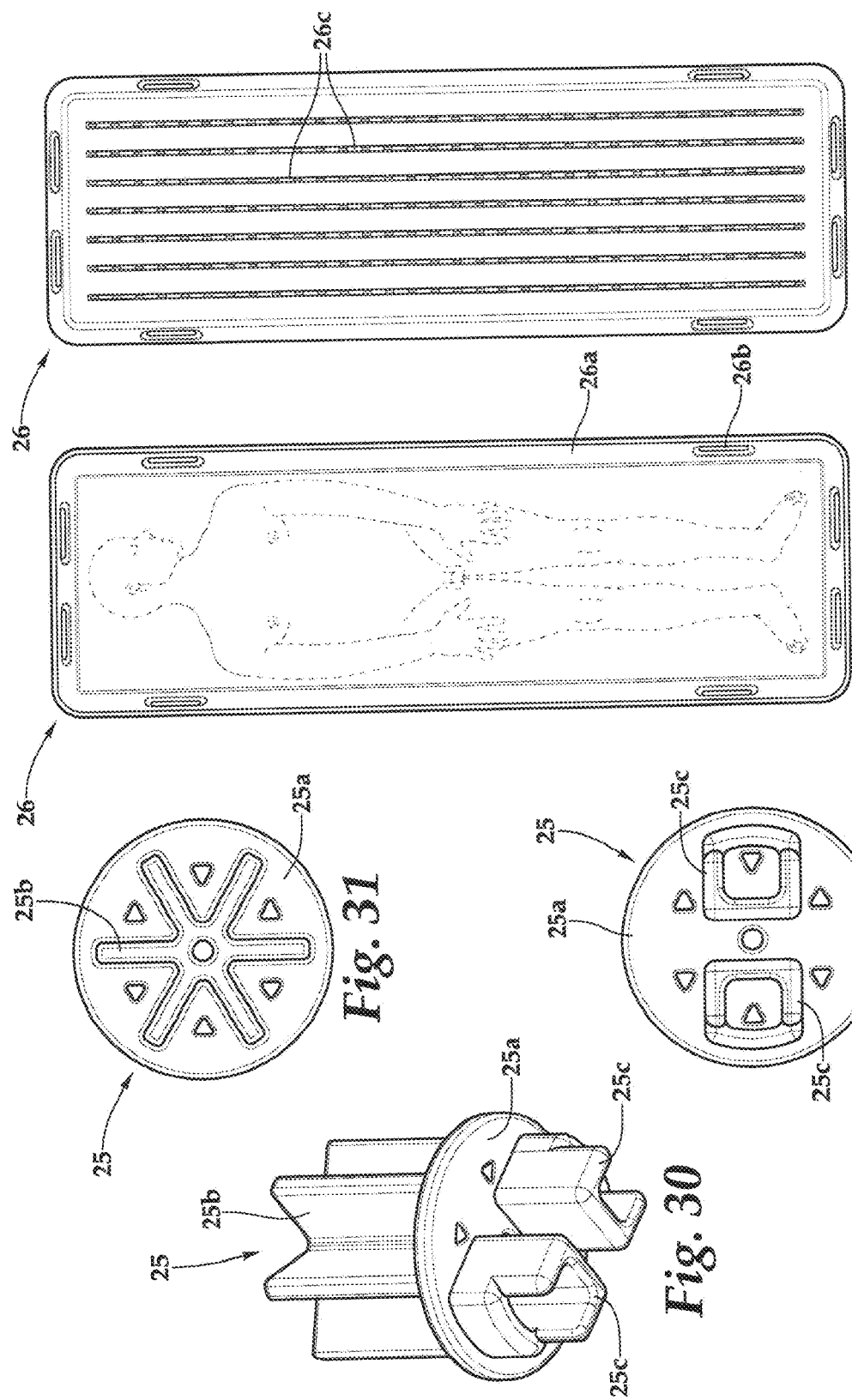

REFRIGERATED PORTABLE ROOM SYSTEM

BACKGROUND OF THE INVENTION

1. Field of the Invention

The present invention relates generally to the field of refrigerated storage units, and more particularly, to a modular and portable refrigerated room for storing cadavers or other items that require refrigeration.

2. Description of the Related Art

U.S. Pat. No. 2,601,634 (Rivette, 1952) describes a combination refrigerator and walk-in storage compartment with side walls that consist of an outer wall and an inner wall and cross braces in between the inner and outer walls. Screws hold the outer and inner walls in spaced relationship to each other, and insulating material is provided between the inner and outer walls. The outer edge of the inner wall comprises a rubber gasket for further insulation. The unit includes supporting shelves for the storage of food items. A conventional refrigerator is also situated within the unit.

U.S. Pat. No. 3,392,497 (Cushman, 1968) provides a modular enclosure comprising panels with plastic edge frames, cover sheets that are adhered to the edge frame, and a core of lightweight insulating material. The edge frames are coupled together with clamp housings, each of which has outwardly extending flanges adapted to enter the cooperating camp housing in an adjacent panel and to key the edges of the panels together. A base member is secured to a permanent floor and is in the form of an upwardly facing channel with an inverted U-shaped member therein. The U-shaped member is vertically adjustable and provides a level support for the panels.

U.S. Pat. No. 3,729,889 (Baruzzini, 1973) discloses a modular insulated panel system in which a series of panels are assembled together with panel locking and sealing members to form an enclosed insulated space or walk-in cooler. The structure includes a base wall with laterally spaced outer edges and adjacent flanges that are connected to the base wall in opposed spaced-apart relation and angularly related to each other to define a wedge-shaped channel in between the flanges. A liner member has an edge margin that is disposed between the flanges and in surface abutment with one of the flanges, and foam insulation material is expanded into the channel between the liner member and the other flange.

U.S. Pat. No. 5,245,838 (Cavalea, III, 1993) involves a portable, modular refrigeration unit comprising an insulated structure including a floor, a roof, and a plurality of wall panels. The wall panels are connected with latches, and a U-shaped channel is adapted to support a refrigeration evaporator unit within the structure. The frame extends beyond the floor and is configured to support a refrigeration compressor unit that is coupled to the evaporator unit.

U.S. Pat. No. 6,244,063 (Yates, 2001) describes a refrigeration wall system with interlocking panels and fastening mechanisms that are embedded within the insulating material inside of the interlocking panels and that are comprised of a substrate material. Each fastener is coated with a backer material that adheres more strongly to the inner layer of the insulating material than the substrate material adheres to the insulating material.

U.S. Pat. No. 8,621,877 (Tuszkiewicz et al., 2014) provides a kit for constructing a modular merchandising unit that includes panels, frame members, joint pieces, and a cooling device. The frame members have a lengthwise shape that defines outer and inner panel mounting assemblies and a joint capture region. The mounting assemblies have opposing legs extending from a base web to define a panel engagement region. Each joint piece includes a block core and orthogonally arranged plug assemblies projecting from faces of the core. The plug assemblies mate with the joint capture region.

U.S. Pat. No. 9,044,371 (Richardson, 20515) discusses a scalable and portable human remains cold storage system with a chiller unit that provides a chilled fluid to a remain chilling bag. A flow divider manifold fluidly communicates with the chiller unit for dispersing the chilled fluid to the remains chilling bag and then channeling warmed fluid back to the chiller unit for re-chilling through a series of supply lies. The chiller fluid maintains a desired temperature within the remains chilling bag. The remains chilling bags are stored on rack systems with a plurality of horizontal shelves. U.S. Pat. No. 9,492,314 (Richardson, 2016) relates to a similar invention used to circulates heating or cooling fluid to a number of pads.

U.S. Pat. No. 9,555,921 (Cronin et al., 2017) discloses a portable, snap-together cooler comprised of six panels and connector elements that snap onto other connector elements to assemble the cooler. Each panel preferably includes attachments elements that enable the panel to be secured onto at least one other panel when the panels are stacked.

U.S. Pat. No. 9,939,188 (Lockwood, 2018) and U.S. Pat. No. 10,731,910 (Lockwood, 2020) involve a portable cooler with a base that supports a refrigeration unit and a plurality of upwardly-extending support poles that support a top portion. The support poles, top portion, and base define an area that is surrounded by a plurality of insulative walls.

U.S. Pat. No. 10,619,907 (Kenneally, 2020) describes a reusable, substantially airtight, and insulated container system made up of a detachable assembled top and side and bottom panels, which are configured to enclose a plurality of pallets of chilled, perishable products for transport. The top panel has a plurality of pouches positioned within horizontal chambers inside of the top panel surface. Hook and loop closures secure and seal the panel assemblies. Thermoplastic polyurethane nylon fabric panel inner and outer surfaces are bonded to an internal insulation layer with thermal-welded edges. The system includes internal temperature control elements for a real-time thermostatically controlled container environment.

U.S. Patent Application Pub. Nos. 2008/0256767 and 2008/0256878 (Berns et al.) provides a portable morgue system comprised of bottom, top and corner rails and corner fittings. The bottom rails include forklift engagement areas. The invention includes a top, a bottom, and vertically opposed end walls, as well as first and second spaced apart opposed vertical platforms. The invention further comprises a remains storage unit with a plurality of modules configured to receive remains.

U.S. Patent Application Pub. No. 2012/0096893 (Martin et al.) discloses a mobile cooled storage unit with a sectional racking structure for storing bodies and body parts in a cooled environment. A removable insulated outer cover is placed over and supported by a racking structure. A chiller is connected to the cover to cool the stored items. The racking structure preferably includes several storage levels, each of which is accompanied by an access aperture in the insulated outer cover. The sides of the structure are zipped onto the top and joined with the adjacent sides by zippers or hook-and-loop strips. Vertically extending tubes extend between different shelf units and may be of different lengths to accommodate differently sized items on the storage shelves.

U.S. Patent Application Pub. No. 2014/0345316 (Godbole et al.) involves a modular cooler assembly that is configured to house one or more beverage containers. The container comprises a number of panels that are interconnected by joints, and at least one of the panels is configured to open and close. In one embodiment, the invention is a collapsible shelf assembly comprising a frame assembly and a plurality of shelf assembles that are rotatably coupled between first and second lateral frames. The first and second lateral frames are configured to move both toward and away from each other.

U.S. Patent Application Pub. No. 2021/0293464 (Pakaj) describes a cold storage container management system in which first and second storage areas are defined within a container, the first storage area being configured to hold refrigerants, and the second storage area being configured to hold insulated items.

BRIEF SUMMARY OF THE INVENTION

The present invention is a refrigerated portable room system comprising: a refrigerated room; an air conditioning unit; an insulated supply hose; an insulated exhaust hose; and a plurality of bumpers that are situated around a perimeter of a floor panel of the refrigerated room; wherein the air conditioning unit is configured to supply cooled air to the refrigerated room, to receive air from the refrigerated room, to cool the air that is received from the refrigerated room, and to return the cooled air to the refrigerated room in a closed loop; wherein the insulated supply hose is connected to a first side wall of the refrigerated room via a first flange; wherein the insulated exhaust hose is connected to the first side wall of the refrigerated room via a second flange; wherein the refrigerated room is sealed as to an exterior environment so as to contain the cooled air within the refrigerated room; wherein the refrigerated room comprises a front wall that is comprised of two layers of a vinyl-coated polyester material with a continuous filament insulation batting contained between them; wherein the inner structure is comprised of two or more modules, each module being comprised of a plurality of vertically aligned horizontal shelves that are connected by stackers and legs to form horizontal levels, each stacker being configured to fit within a receptacle in the horizontal shelves and to fit within one end of a leg; wherein the horizontal shelves of the modules in the inner structure are aligned so as to form longitudinally oriented compartments; wherein the front wall comprises a front flap corresponding to each horizontal level of the inner structure; wherein each front flap has a bottom horizontal edge and an arc-shaped upwardly extending perimeter that is formed by a zipper; wherein a front surface of each front flap comprises one or more windows, each window being comprised of transparent plastic and configured to receive documents; and wherein the number of windows on each front flap corresponds to the number of longitudinally oriented compartments.

In a preferred embodiment, the first flange is situated at a top of the first side wall, and the second flange is situated at a bottom of the first side wall. In another preferred embodiment, an inside of each front flap comprises an overhanging flap that is configured to rest on top of an along a front edge of a horizontal shelf, and the overhanging flap is situated on a back side of the bottom horizontal edge of the front flap. Each of the two or more modules is preferably configured to receive either caster wheels or legs underneath a bottom-most level of the horizontal shelves. Optionally, one of the horizontal levels is taller than the other horizontal levels within the inner structure.

In a preferred embodiment, the refrigerated room further comprises a roof panel, a second side wall, and a rear wall; wherein all of the front wall, the rear wall, the first and second side walls, the floor panel and the roof panel and connected to one another with hook-and-loop fasteners. Preferably, the rear wall, the first and second side walls, the floor panel and the roof panel are all comprised of two layers of a vinyl-coated polyester material with a continuous filament insulation batting contained between them. An inside layer of the rear wall preferably comprises two air vents that are spaced apart from one another and situated at a top of the rear wall. An inside layer of the first side wall preferably comprises two air vents that are spaced apart from one another and situated at a top of the first side wall. An inside layer of the second side wall preferably comprises two air vents that are spaced apart and situated at a top of the second side wall. An inside layer of the roof panel preferably comprises two air vents that are spaced apart from one another.

In a preferred embodiment, the floor panel comprises a lip that extends around the perimeter of and is perpendicular to the floor panel; wherein the lip is configured to connect the floor panel to the front wall, the rear wall, and the first and second side walls; and wherein the lip is configured to attach the floor panel to the bumpers. Preferably, each bumper is comprised of a downwardly sloping outer edge and a straight vertical interior edge. Optionally, the invention further comprises loops that extend from a bottom edge of the overhanging flap and are configured to secure the front wall to the legs that are situated at a front of the inner structure.

In a preferred embodiment, each stacker is comprised of a circular flat plate, a radial array that is situated on a first side of the circular flat plate, and two U-shaped channels that are situated on a second side of the circular plate; and the U-shaped channels are configured to press fit into the receptacles in the horizontal shelves, and the radial array is configured to press fit into a leg. Optionally, the invention further comprises a plurality of body trays; wherein each body tray has an angled perimeter wall with slots that are configured to serve as handles for grasping or lifting the body tray; and wherein each body tray further comprises a plurality of longitudinal channels on an underside of the body tray.

BRIEF DESCRIPTION OF THE DRAWINGS

FIG. 1 is a front perspective view of the present invention in a fully assembled state.

FIG. 2 is a front view of the present invention in a fully assembled state.

FIG. 3 is a left side view of the present invention shown with the air hose and air conditioning unit removed.

FIG. 4 is a rear view of the air conditioning unit shown in FIGS. 1 and 2.

FIG. 5 is a front view of the present invention shown with one of the front flaps in an open (unzipped) position.

FIG. 12B is a front view of the present invention in a fully assembled state with the walls, roof panel and floor removed.

FIG. 13 is a perspective view of the three different sizes of legs of the present invention.

FIG. 14 is a right side view of the present invention in a fully assembled state with the walls, roof panel and floor removed.

FIG. 15A is a bottom perspective view of the caster wheel adapter of the present invention.

FIG. 15B is a top perspective view of the caster wheel adapter of the present invention.

FIG. 15C is a perspective view of the caster wheel shown in relation to the caster wheel adapter of the present invention.

FIG. 30 is a perspective view of the stacker of the present invention.

FIG. 31 is a top view of the stacker of the present invention.

FIG. 32 is a bottom view of the stacker of the present invention.

FIG. 33 is a top view of the body tray of the present invention.

FIG. 34 is a bottom view of the body tray of the present invention.

REFERENCE NUMBERS

Figure 6:
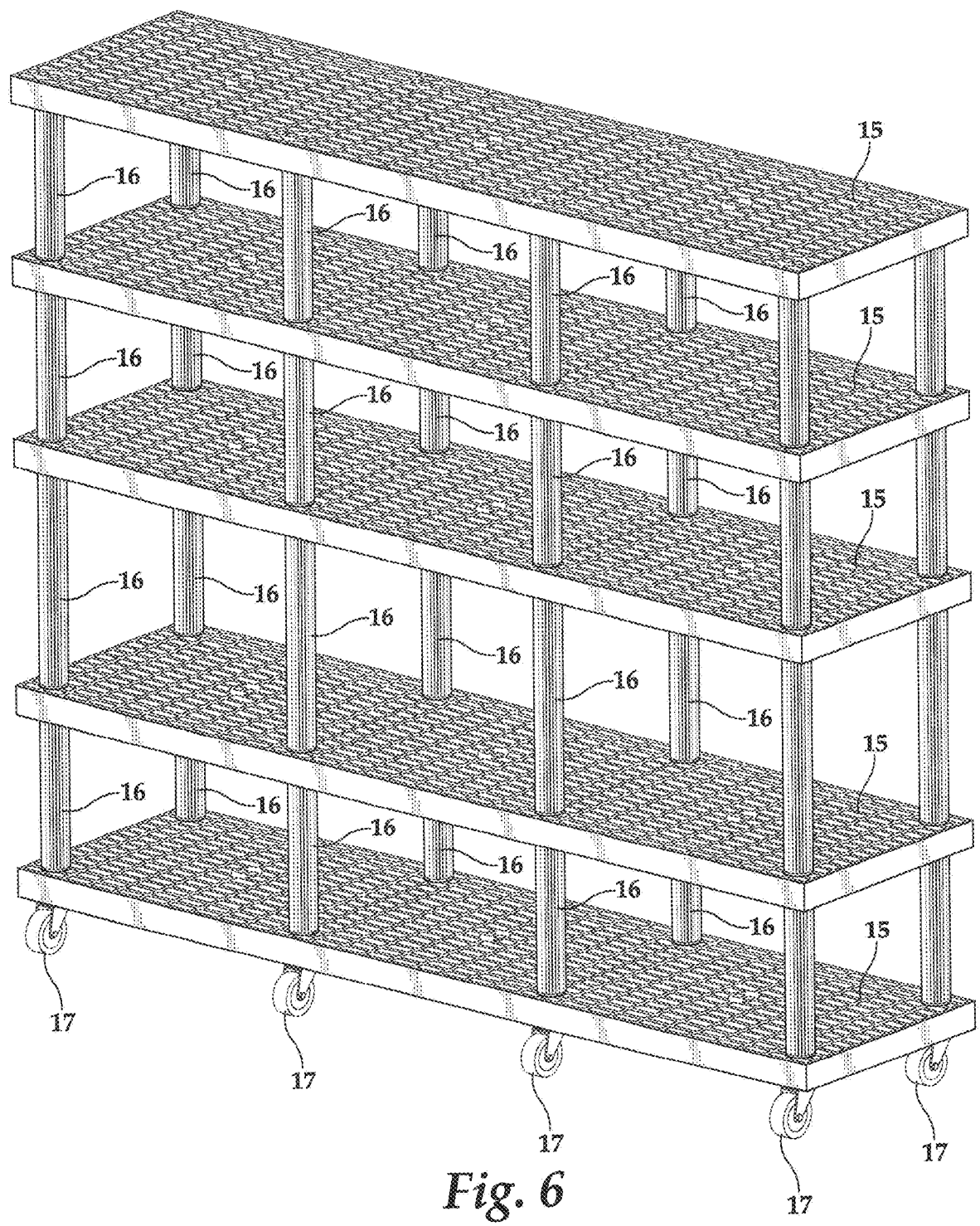
FIG. 6 is a perspective view of a first module of the present invention.

1 Refrigerated room
2 Air conditioning unit
2a Temperature-control screen
2b On/off switch
2c Electrical outlet
2d First sensor
2e Second sensor
3 Insulated supply hose
4 Insulated exhaust hose
5 First side wall
6 First flange
7 Second flange
8 Front wall
9 Front flap
9a Bottom edge (of front flap)
9b Arc-shaped upwardly extending perimeter (of front flap)
9c Zipper
10 Window
11 Air input port
12 Air output port
13 Bumper (floor)
14 Overhanging flap
15 Horizontal shelving
15a First receptacle
15b Second receptacle
16 Leg
17 Caster wheel
17a Caster wheel adapter
17b Caster wheel
17c Shaft
17d Bracket
17e Aperture
18 Hook-and-loop fastener
19 Rear wall
20 Air vent
20a Perforated face (of air vent)
21 Second side wall
22 Roof panel.
23 Floor
23a Lip (of floor)
24 Loop
25 Stacker
25a Radial array (of stacker)
25b U-shaped channels (of stacker)
26 Body tray
26a Angled perimeter wall
26b Slot
26c Longitudinal channel

DETAILED DESCRIPTION OF INVENTION

FIG. 1 is a front perspective view of the present invention in a fully assembled state. As shown in this figure, the present invention comprises a refrigerated room 1, an air conditioning unit 2, an insulated supply hose 3, and an insulated exhaust hose 4. The air conditioning unit 2 is configured to supply cooled air to the refrigerated room 1 and to receive air from the refrigerated room, cool it, and return the cooled air to the refrigerated room in a closed loop. The insulated supply hose 3 is connected to a first side wall 5 of the refrigerated room via a first flange 6, and the insulated exhaust hose 4 is connected to the first side wall 5 via a second flange 7. The first flange 6 is situated at the top of the first side wall 5, and the second flange 7 is situated at the bottom of the first side wall 5. The refrigerated room 1 is preferably sealed to the exterior environment so that the cooled air is contained within the refrigerated room 1.

FIG. 2 is a front view of the present invention in a fully assembled state. As shown in this figure, the refrigerated room 1 comprises a front wall 8, which is preferably comprised of two layers of a vinyl-coated polyester material with a continuous filament insulation batting contained between them. In a preferred embodiment, the insulation batting is comprised of 90% 2.25 denier hollow (20% void) continuous filament polyester fibers chemically bonded with a cross-linked acrylic resin combined with a fluorine-free durable water repellant. The front wall 8 preferably comprises a front flap 9 corresponding to each level of the inner structure (see FIG. 12A). Each front flap 9 has a bottom horizontal edge 9a and an arc-shaped upwardly extending perimeter 9b that is formed by a zipper 9c. A plurality of windows 10 comprised of transparent plastic is affixed to the front face of each front flap 9. Each window 10 is open on the right-hand side (and closed on all three of the remaining sides of the window) so as to permit paperwork to be inserted into the window. This paperwork may be used to identify the cadavers situated inside of the refrigerated room 1. The number of windows 10 corresponds to the number of longitudinally oriented compartments within the inner structure (see FIG. 12A), and each window 10 is situated at the proximal end of each such compartment. As used herein, the term "longitudinally oriented," when used to describe the compartments within the inner structure, means oriented front to back. In a preferred embodiment, the bottom edge 9a of each front flap 9 extends from the left-most leg of the inner structure to the right-most leg of the inner structure so as to expose the entire width of the inner structure (and all three longitudinally oriented compartments) when the flap is opened (see FIG. 5).

FIG. 3 is a left side view of the present invention shown with the air hose and air conditioning unit removed. As shown in this figure, the first flange 6 defines an air input port 11 in the first side wall 5, and the second flange 7 defines an air exhaust port 12 in the first side wall. When the invention is fully installed, air is circulated from the air conditioning unit 2 to the refrigerated room 1 via the air input port 11, and air is recirculated from the refrigerated room 1 to the air conditioning unit 2 via the air output port 12. This figure also shows the bumper 13 that is situated around the perimeter of the floor of the refrigerated room and configured to provide added stability to the entire structure (see also FIG. 28).

FIG. 4 is a rear view of the air conditioning unit shown in FIGS. 1 and 2. This figure shows the custom air conditioning unit 2 that was designed for use in connection with the present invention. The air conditioning unit 2 is configured to plug into a standard 120-volt electrical wall outlet. This unit includes a temperature-control screen 2a, which is configured to enable the operator to control the temperature of the air that is delivered into the refrigerated room 1 from the air conditioning unit 2. In a typical installation, this temperature is set at 35 degrees Fahrenheit. The unit also includes an on/off switch 2b and a standard electrical outlet 2c.

The air conditioning unit 2 is configured to house a compressor, condenser coil, condenser fan, evaporator coil, and evaporator blower (not shown). The unit has two duct connections-one on the outlet (rear) side of the unit and one on the inlet (front) side of the unit. FIG. 4 shows the air outlet duct connection 2d. Inside of the air outlet duct connection 2d are two sensors-one sensor 2e is configured to sense the temperature of the air that is being blown into the insulated supply hose 3 from the air conditioning unit 2. The other sensor 2f is situated within the condenser coil and is configured to sense the temperature inside of the condenser coil. These two sensors 2e, 2f and in data communications with a thermostat that is also located within the air conditioning unit 2. The thermostat is configured to control the temperature of the air that is supplied to the refrigerated room 1 by adjusting the speed of the compressor, as is known in the art.

FIG. 5 is a front view of the present invention shown with one of the front flaps in an open (unzipped) position. As shown in this figure, each of the front flaps 9 can be unzipped to provide access to the horizontal shelves within the refrigerated room 1. These shelves are part of what is referred to above as the "inner structure." On the inside of each front flap 9 is an overhanging flap 14 that extends along the bottom edge of the front flap 9. Each overhanging flap 14 is configured so that when the front flap 9 is opened, the overhanging flap 14 rests on top of and along the front edge of the horizontal shelf (see also FIG. 29). The purpose of the overhanging flap 14 is to provide stability to the front flap 9 and to keep it from falling down when it is in an open position. The overhanging flap 14 is preferably made of the same material as the front wall 8 (two layers of a vinyl-coated polyester material with a continuous filament insulation batting contained between them).

Figure 12A:
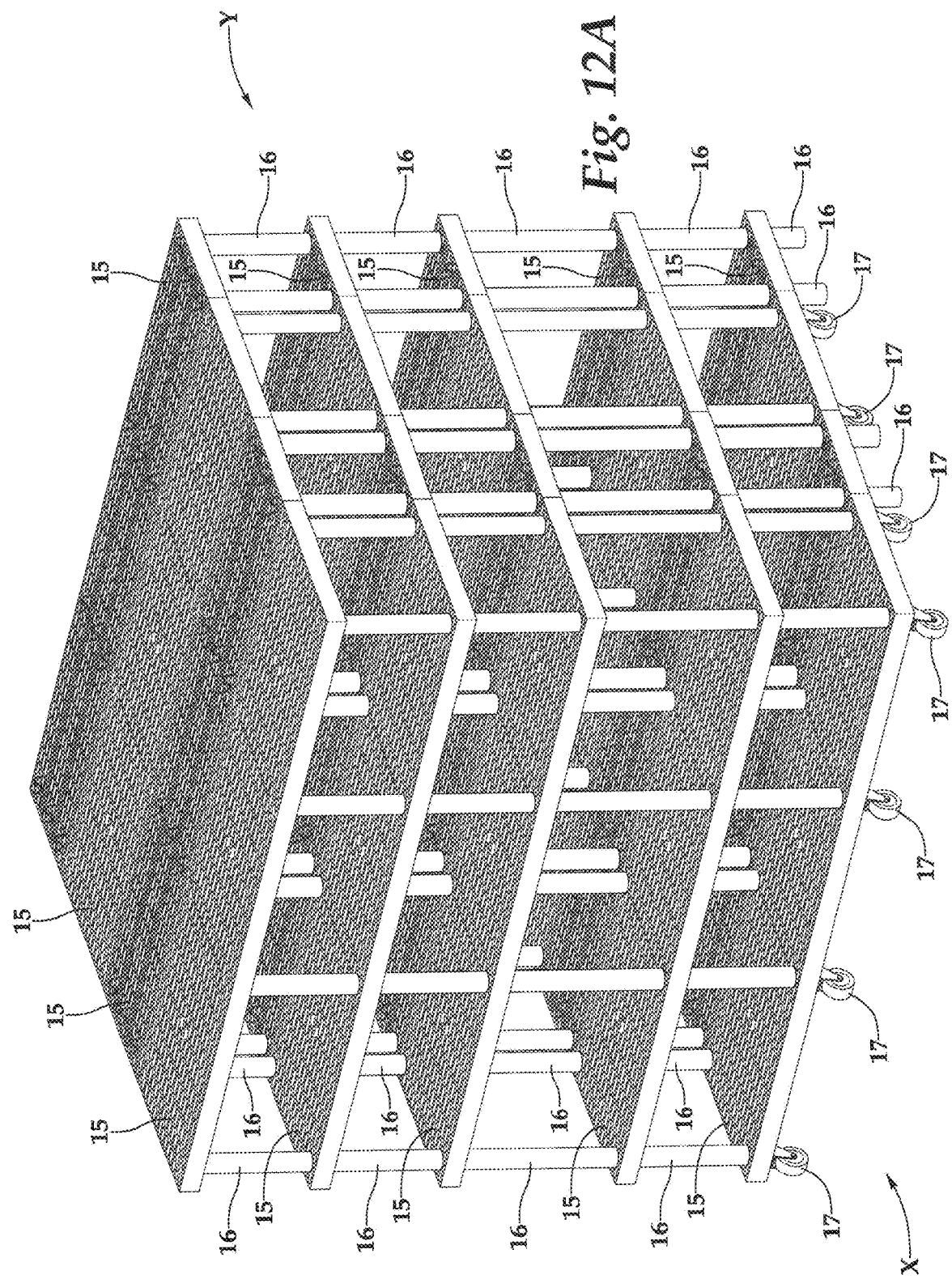
FIG. 12A is a perspective view of the present invention in a fully assembled state with the walls, roof panel and floor removed.

FIG. 6 is a perspective view of a first module of the present invention. In this particular embodiment, the first module is comprised of five levels of horizontal shelving 15 with legs 16 interposed between the horizontal shelving. The top-most level of horizontal shelving 15 functions as the ceiling of the inner structure and supports the roof panel (not shown), and the remaining four levels of horizontal shelving are configured to receive body trays (see FIG. 5) when all of the modules are lined up, as shown in FIG. 12A. In this particular module, caster wheels 17 are provided underneath the bottom-most level of horizontal shelving.

Figure 7:
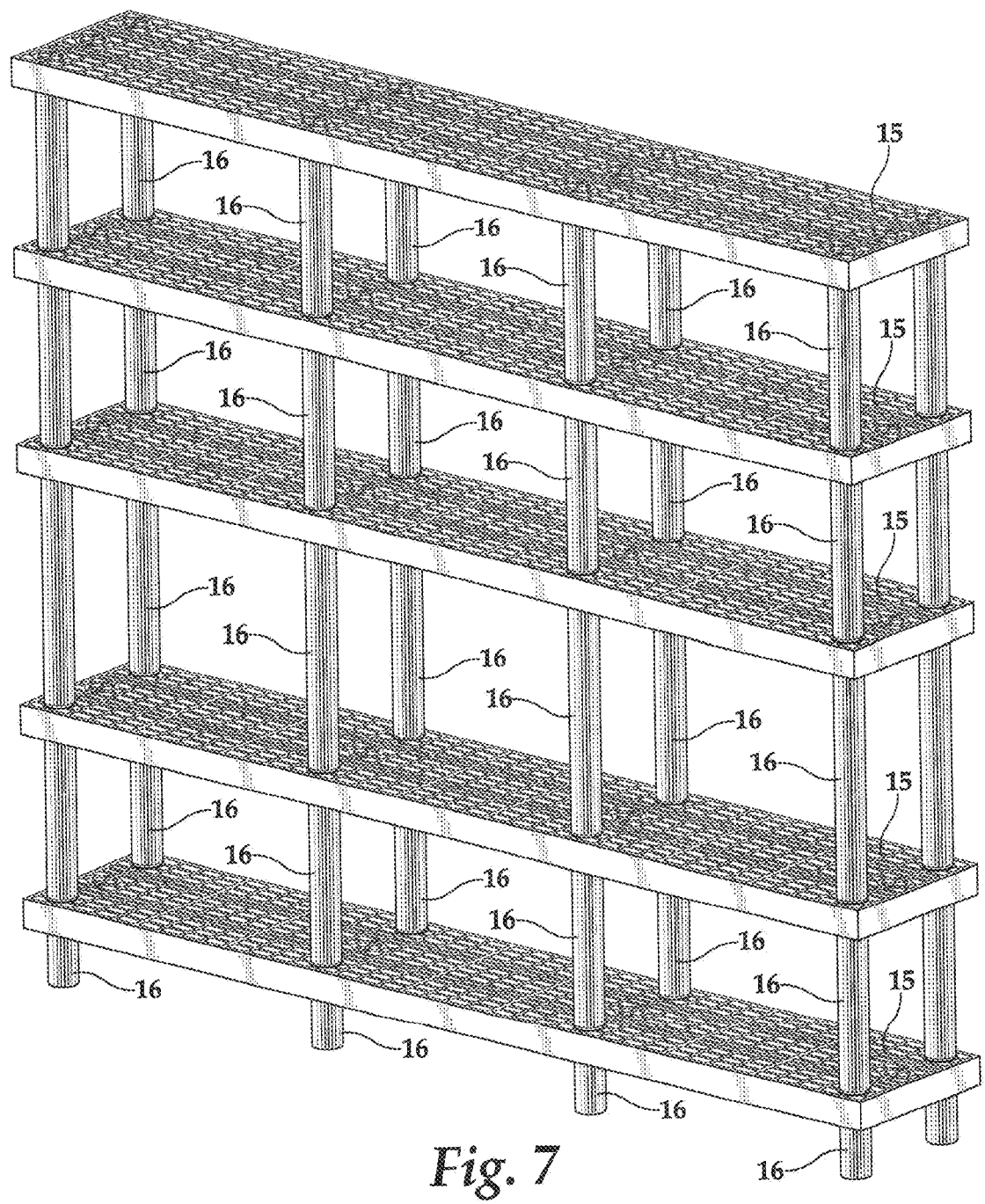
FIG. 7 is a perspective view of a second module of the present invention.

FIG. 7 is a perspective view of a second module of the present invention. This module is similar to that shown in FIG. 6, except that the horizontal shelving is narrower (from front to back), and rather than caster wheels 17, there are legs 16 underneath the bottom-most level of horizontal shelving. The present invention is configured so that either caster wheels 17 or legs 16 may be used on the bottom of any module. As used herein, the term "module" means a free-standing horizontal shelving unit, as shown.

Figure 8:
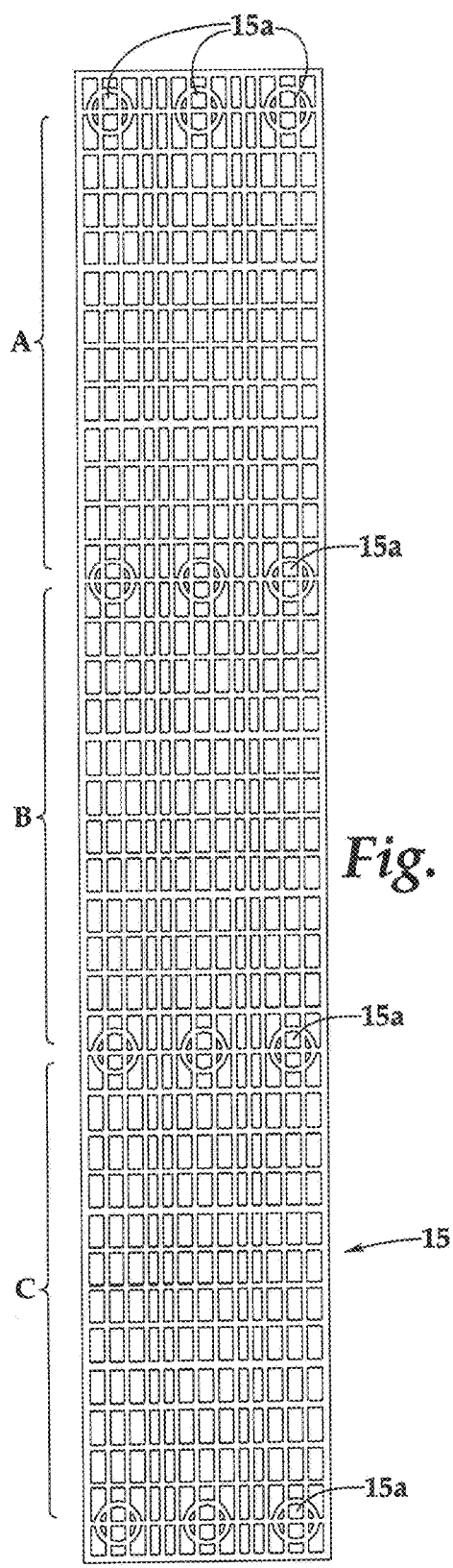
FIG. 8 is a top view of a first embodiment of the horizontal shelving of the present invention.
Figure 9:
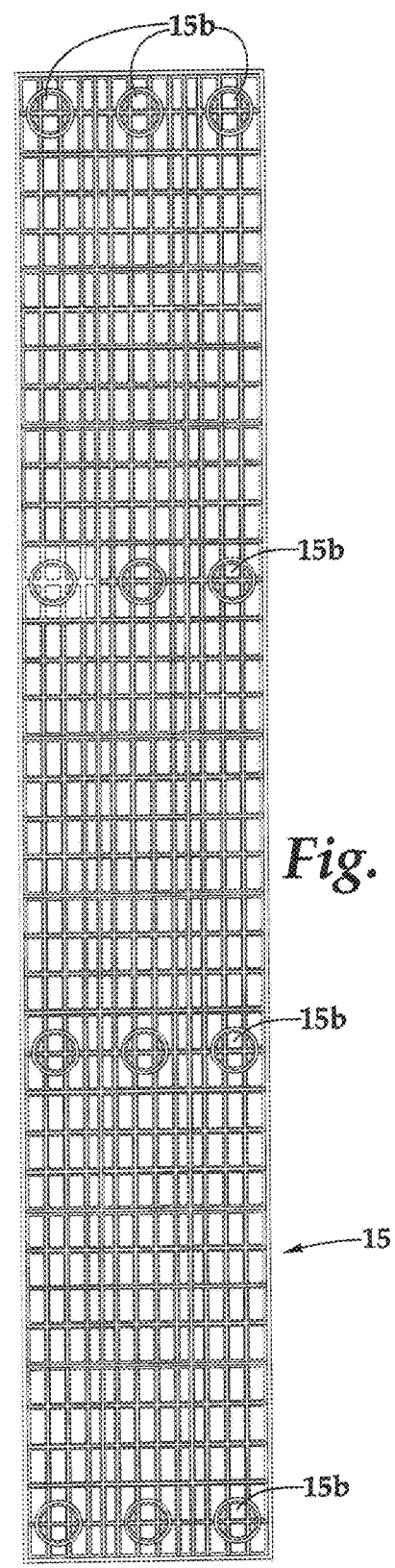
FIG. 9 is a bottom view of a first embodiment of the horizontal shelving of the present invention.
Figure 10:
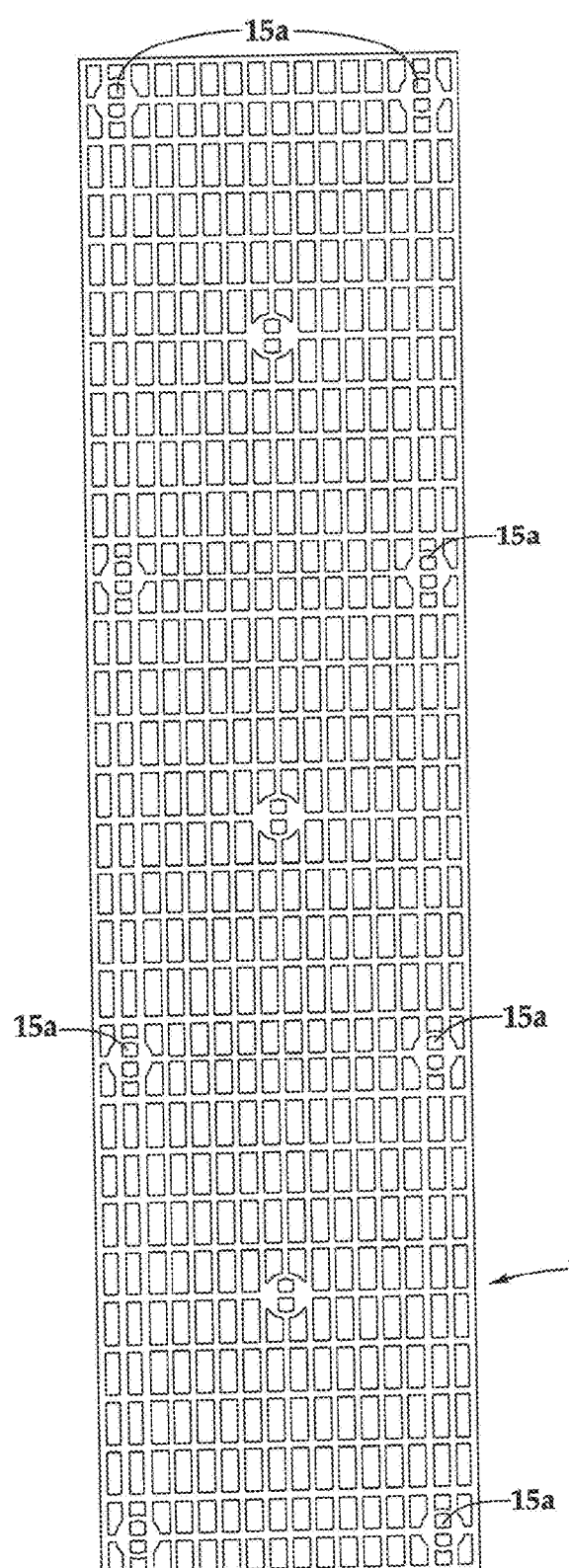
FIG. 10 is a top view of a second embodiment of the horizontal shelving of the present invention.
Figure 11:
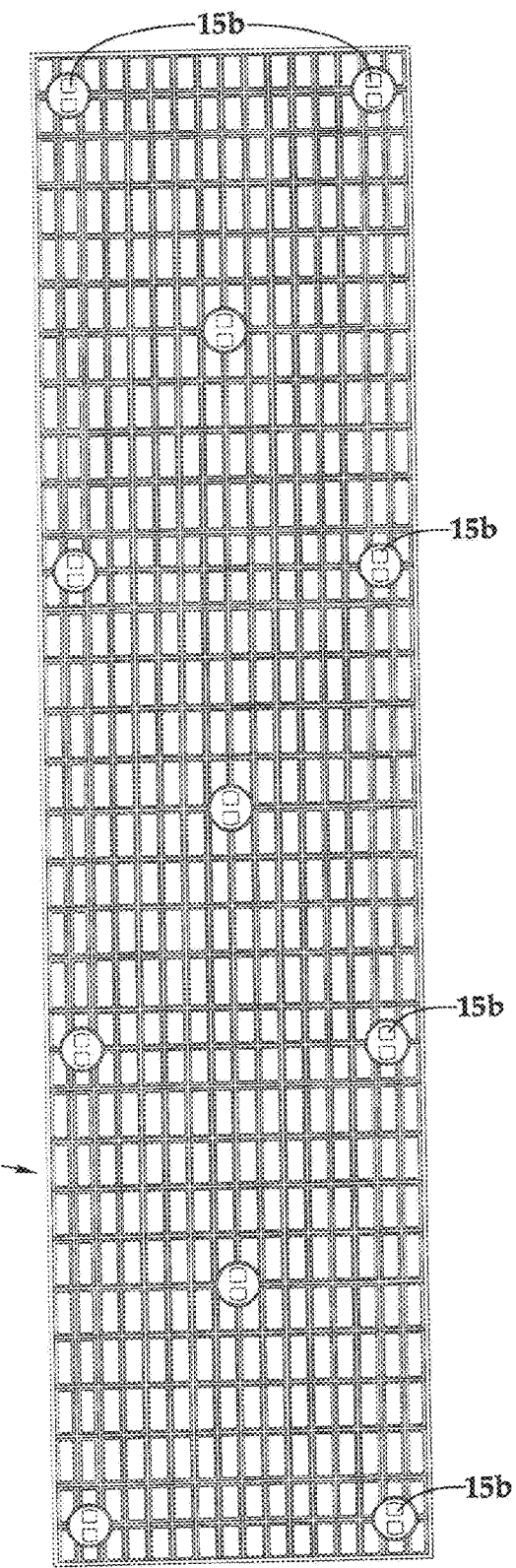
FIG. 11 is a bottom view of a second embodiment of the horizontal shelving of the present invention.

FIG. 8 is a top view of a first embodiment of the horizontal shelving of the present invention. As shown in FIGS. 9-12, in a preferred embodiment, there are two different sizes of horizontal shelving 15. The horizontal shelving 15 that is shown in FIGS. 8 and 9 is preferably 16 inches wide (from left to right in this figure), whereas the horizontal shelving 15 that is shown in FIGS. 10 and 11 is preferably 24 inches wide. Referring to FIG. 8, each horizontal shelving 15 is rectangular in shape and comprises a top surface that is flat. The top surface may contain holes, as shown, to reduce the overall weight of the shelving. Most importantly, the top surface of each horizontal shelving 15 comprises a plurality of first receptacles 15a that are configured to receive the stackers that are shown in FIGS. 30-32. These first receptacles 15a are arranged in rows that run laterally across the width of the horizontal shelving 15, and they are located where the legs 16 will be positioned, that is, on the far right-hand side of the shelving (which would be at the top of FIG. 8), on the far left-hand side of the shelving (which would be at the bottom of FIG. 8), and in two additional rows situated apart from the ends of the horizontal shelving. In a preferred embodiment, the first receptacles 15a are configured to form three separate compartments (designated as A, B and C) within the horizontal shelving when the legs are installed.

FIG. 9 is a bottom view of a first embodiment of the horizontal shelving of the present invention. As shown in this figure, the horizontal shelving 15 also comprises a plurality of second receptacles 15b. These second receptacles 15b are situated on the underside of the horizontal shelving, directly underneath the first receptacles 15a. In other words, each second receptacle is situated directly underneath a first receptacle 15a, and the number of second receptacles equals the number of first receptacles. Each second receptacle 15b is configured to receive a caster wheel adapter (see FIG. 15B) or a leg 16.

FIG. 10 is a top view of a second embodiment of the horizontal shelving of the present invention, and FIG. 11 is a bottom view of a second embodiment of the horizontal shelving of the present invention. The above description of the first and second receptacles 15a, 15b applies equally to FIGS. 10 and 11, the difference being that the horizontal shelving shows in FIGS. 10 and 11 is wider than the horizontal shelving shown in FIGS. 8 and 9.

FIG. 12A is a perspective view of the present invention in a fully assembled state with the walls, roof panel and floor removed. This figure shows what is referred to herein as the "inner structure." In this embodiment, the inner structure is comprised of four modules-two of the modules shown in FIG. 6, and two of the modules shown in FIG. 7. The modules are aligned side-to-side so that the four levels of shelves in each module are horizontally aligned with the four levels of shelves in the other modules, thereby creating four levels of continuous shelves that extend from the front to the back of the inner structure. In this figure, the front of the inner structure is designated with an "X," and the back (rear) of the structure is designated with a "Y" (see also FIG. 14).

FIG. 12B is a front view of the present invention in a fully assembled state with the walls, roof panel and floor removed. Each module preferably comprises a bariatric shelf (designated as "D" in FIGS. 12B and 14) that is larger from top to bottom than the three other levels of shelves within the module. The inclusion of a bariatric shelf enables the inner structure to accommodate obese bodies.

FIG. 13 is a perspective view of the three different sizes of legs of the present invention. In a preferred embodiment, the tallest leg is 24 inches tall, the middle leg is 16 inches tall, and the shortest leg is six inches tall. The legs 16 are configured to press fit into the receptables 15b on the underside of the horizontal shelving. The tallest legs are used to create the bariatric shelf, the middle legs are used to create the non-bariatric shelves, and the shortest legs are used as "feet" at the bottom of the inner structure (see FIG. 7).

FIG. 14 is a right side view of the present invention in a fully assembled state with the walls, roof panel and floor removed. In this figure, the 16- and 24-inch deep (front to back) modules are in an alternating configuration, but the modules may also be configured so that the two modules having 16-inch shelving are next to each other with the two modules having 24-inch shelving at the front and back of the inner structure, or vice versa.

FIG. 15A is a bottom perspective view of the caster wheel adapter of the present invention. FIG. 15B is a top perspective view of the caster wheel adapter of the present invention. FIG. 15C is a perspective view of the caster wheel shown in relation to the caster wheel adapter of the present invention. As shown in these three figures, each caster wheel 17 comprises a caster wheel adapter 17a and a wheel 17b that rotates about a shaft 17c that is fixedly attached to a bracket 17d that supports an upwardly extending protrusion 17d. The upwardly extending protrusion 17d is configured to fit inside of a central aperture 17e in the caster wheel adapter 17a. The top part of the caster wheel adapter 17a is configured to press fit into the receptables 15b on the underside of the horizontal shelving 15.

Figure 16:
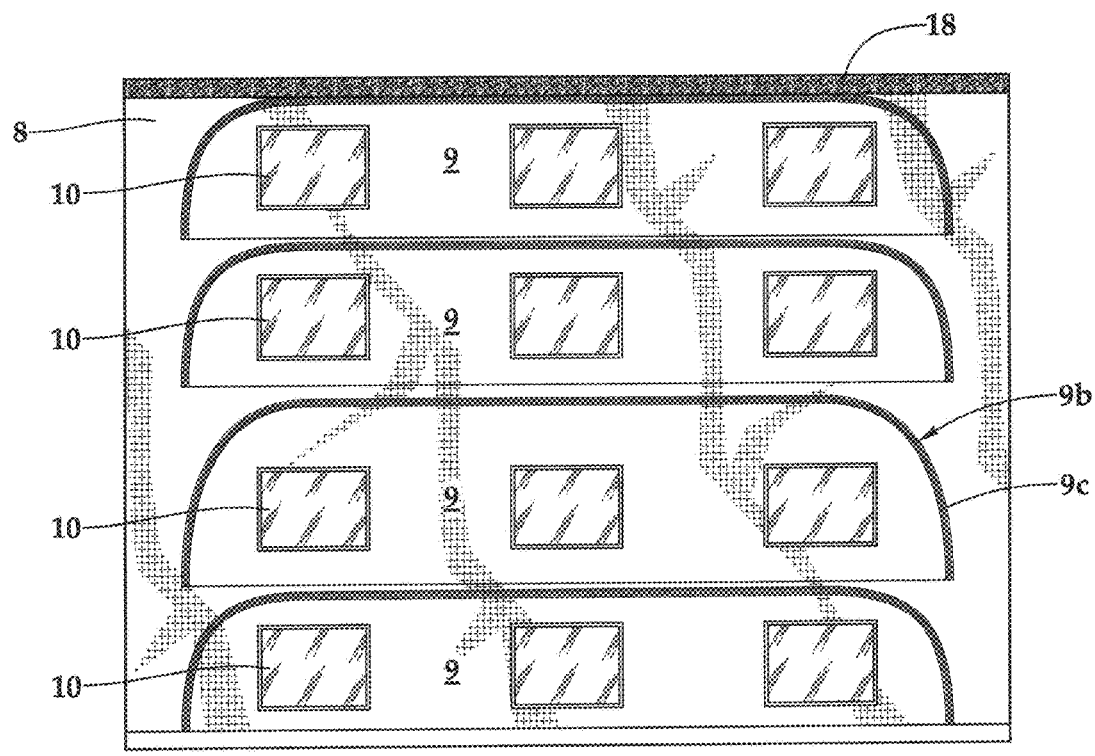
FIG. 16 is an outside view of the front wall of the present invention.

FIG. 16 is an outside view of the front wall of the present invention. This figure shows the front flaps 9, the windows 10, and the strip of hook-and-loop fastener 18 that extends across the top outside edge of the front panel 8. The hook-and-loop fastener 18 is used to affix the front panel 8 to the roof panel (see FIG. 25).

Figure 17:
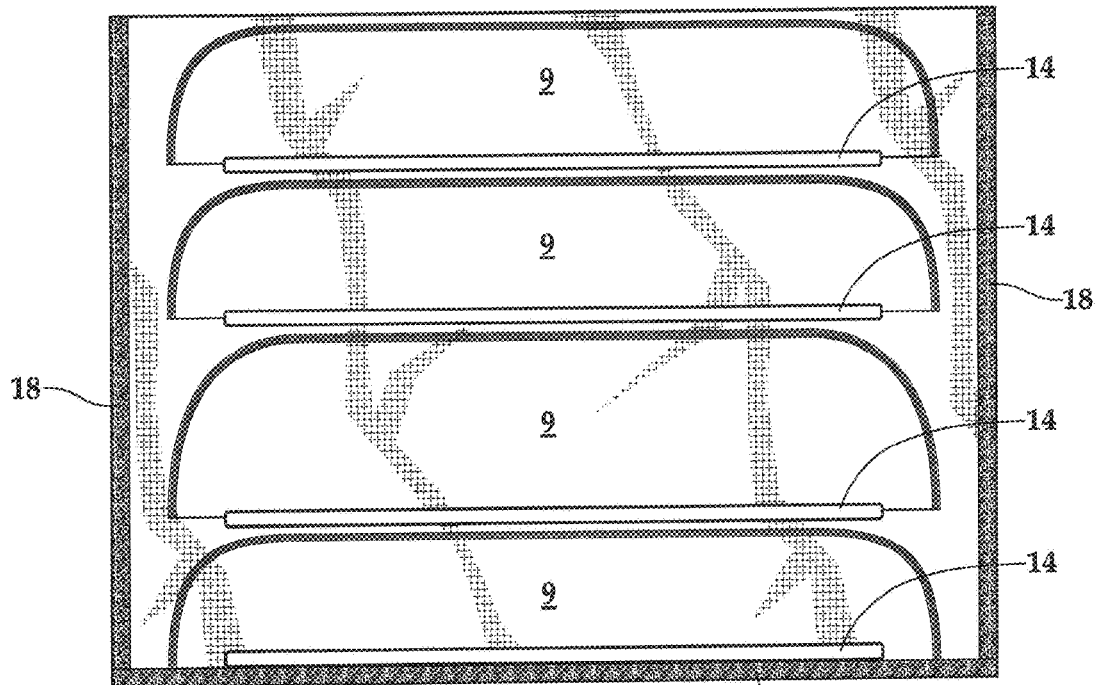
FIG. 17 is an inside view of the front wall of the present invention.

FIG. 17 is an inside view of the front wall of the present invention. This figure shows the inside of the front flaps 9, as well as the overhanging flaps 14 that are situated along the bottom edge of each front flap. Strips of hook-and-loop fastener 18 extend along both sides and the bottom of the front wall 8 and are used to secure the front wall to the first and second side walls (see FIGS. 20 and 21) and the floor (see FIG. 26).

Figure 18:
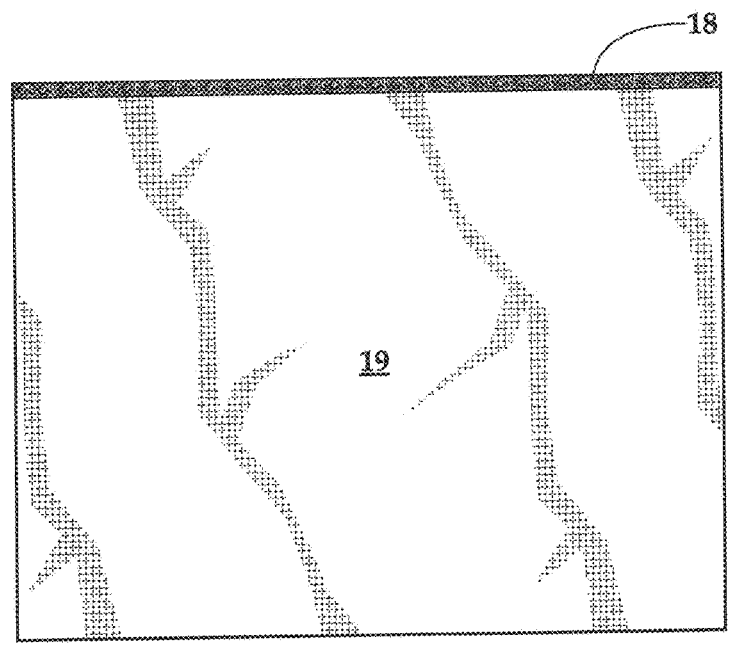
FIG. 18 is an outside view of the rear wall of the present invention.
Figure 19:
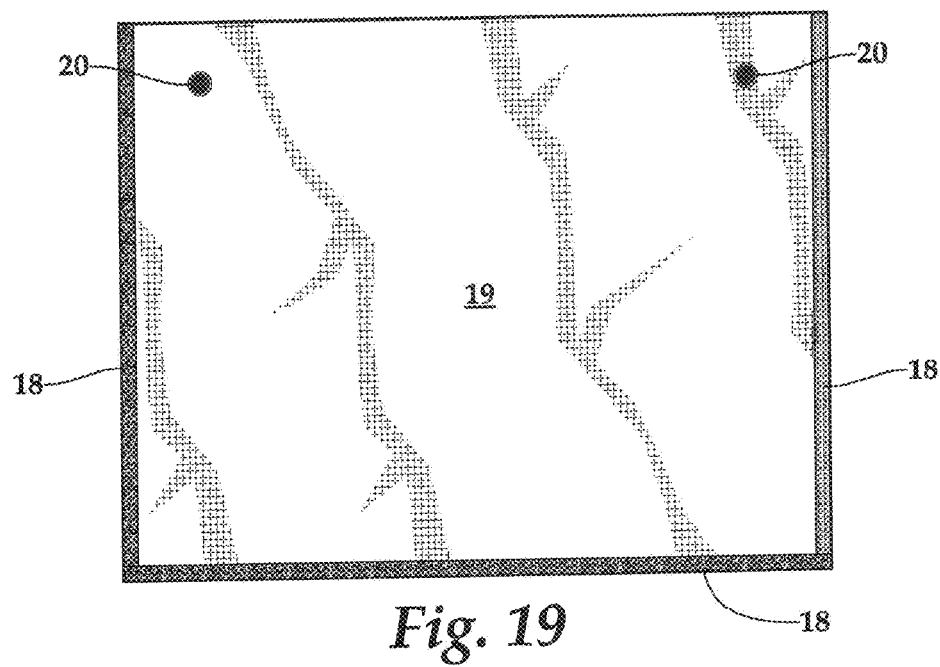
FIG. 19 is an inside view of the rear wall of the present invention.

FIG. 18 is an outside view of the rear wall of the present invention, and FIG. 19 is an inside view of the rear wall of the present invention. The rear wall 19 is made of the same material and interior insulation as the front wall. FIG. 18 shows the strip of hook-and-loop fastener 18 that extends across the top of the outside of the rear wall 19 and is used to secure the rear wall 19 to the roof panel (see FIG. 25). FIG. 19 shows the strips of hook-and-loop fastener 18 that extend along the side and bottom edges of the interior of the rear wall 19 and are used to secure the rear wall to the side walls (see FIGS. 20 and 21) and the floor (see FIG. 26). In a preferred embodiment, the inside layer of the rear wall 19 comprises two air vents 20 that are situated at the top of the rear wall and spaced apart so that one air vent 20 is located on the right-hand side of the rear wall, and the other air vent 20 is located on the left-hand side of the rear wall. The purpose of the air vents 20 is to make it easier to roll up and store the rear wall 19. Note that the air vents 20 allow air to escape from inside of the two layers of vinyl-coated polyester material into the exterior environment, but the vents 20 do not extend through the outer layer of material (this is also true of the air vents in the side walls and roof panel).

Figure 20:
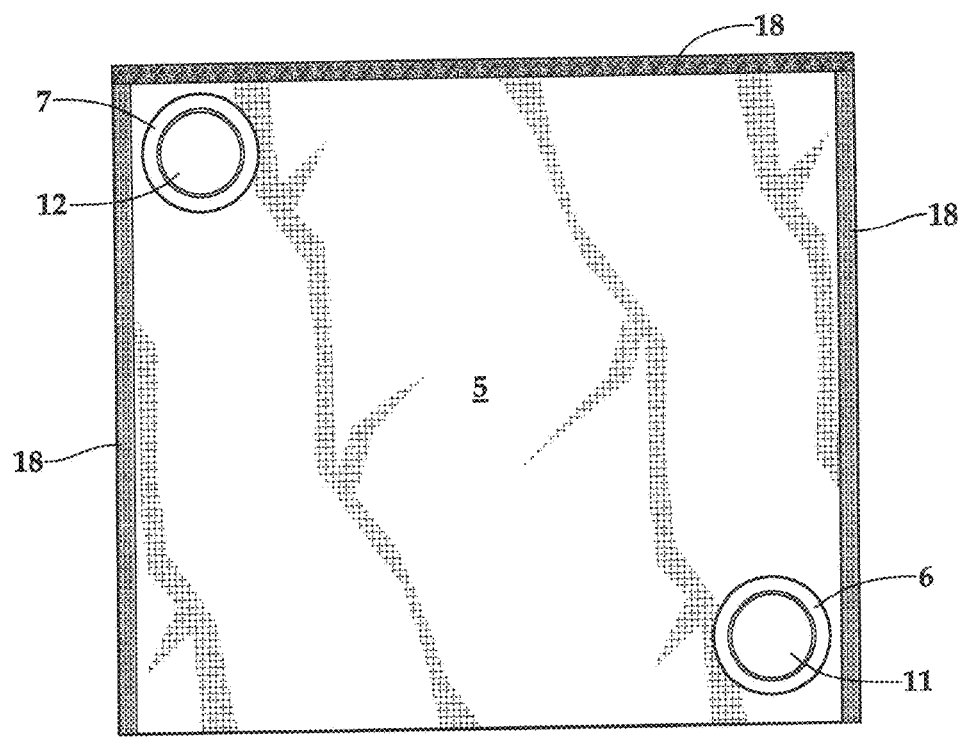
FIG. 20 is an outside view of the left side wall of the present invention.
Figure 21:
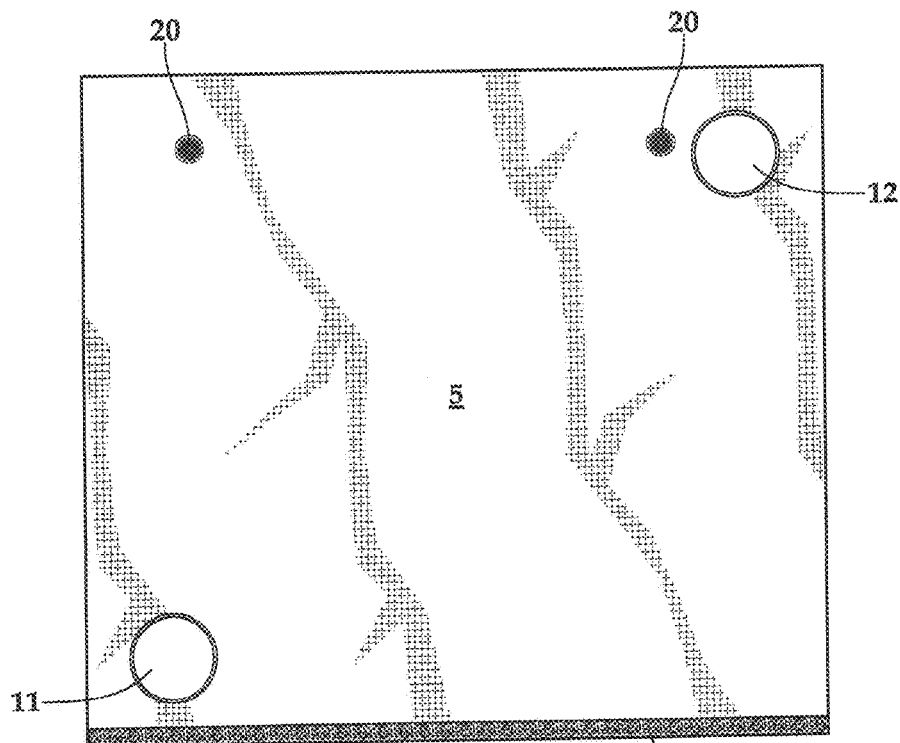
FIG. 21 is an inside view of the left side wall of the present invention.

FIG. 20 is an outside view of the left side wall of the present invention, and FIG. 21 is an inside view of the left side wall of the present invention. This is the same side wall 5 that is shown in FIG. 1. These two figures show the air input port 11, which is located in the bottom right-hand corner of the first side wall 5, and the air exhaust port 12, which is located in the top left-hand corner of the first side wall 5. The flanges 6, 7 described above are shown in FIG. 20. Note that the air input 11 port is located at the bottom and the air output port 12 is located at the bottom of the first side wall 5 because hot air rises, and the system is designed to deliver cooled air into and to remove warmer air from the refrigerated room.

Figure 25:
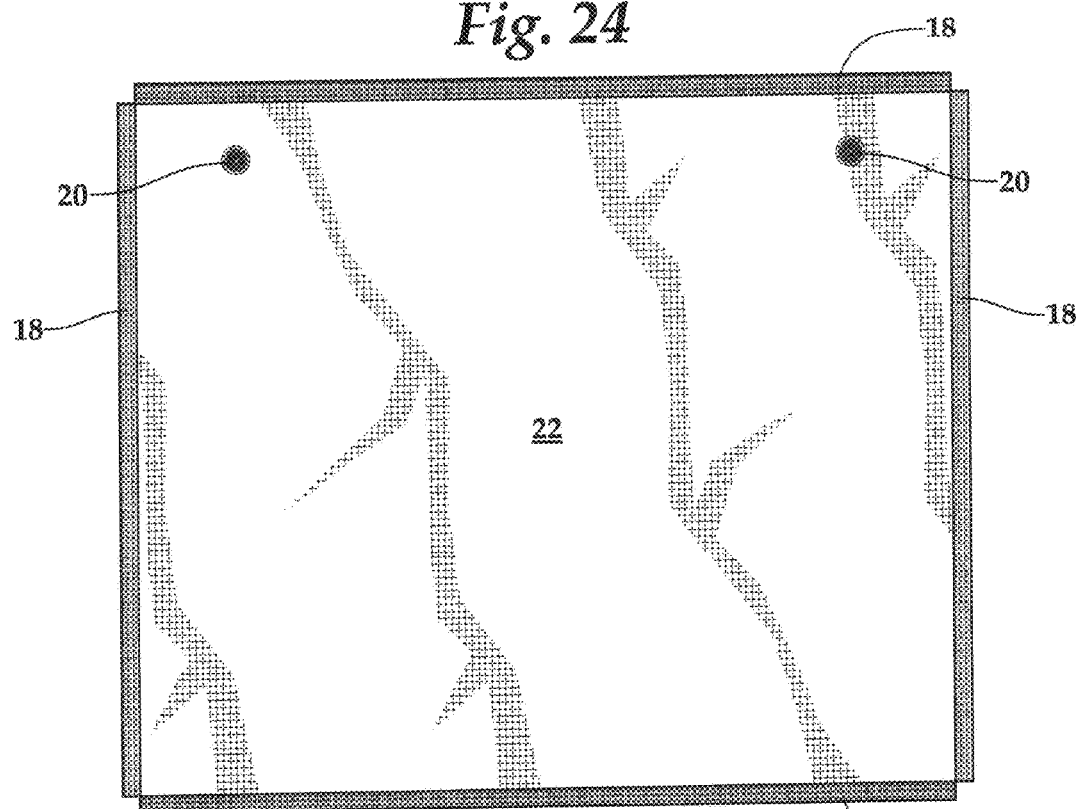
FIG. 25 is an inside view of the roof panel of the present invention.

FIG. 20 shows the strips of hook-and-loop fastener 18 that extend across the top edge and along the side edges of the interior of the first side wall 5 and are used to secure the first side wall to the front and rear walls 8, 19 and the roof panel (see FIG. 25). FIG. 21 shows the strip of hook-and-loop fastener 18 that extends across the bottom of the outside of the first side wall 5 and is used to secure the first side wall to the floor (see FIG. 26). The first side wall 5 comprises two air vents 20 that are situated at the top of the first side wall and spaced apart so that one air vent 20 is located on the right-hand side of the first side wall, and the other air vent 20 is located on the left-hand side of the first side wall.

Figure 22:
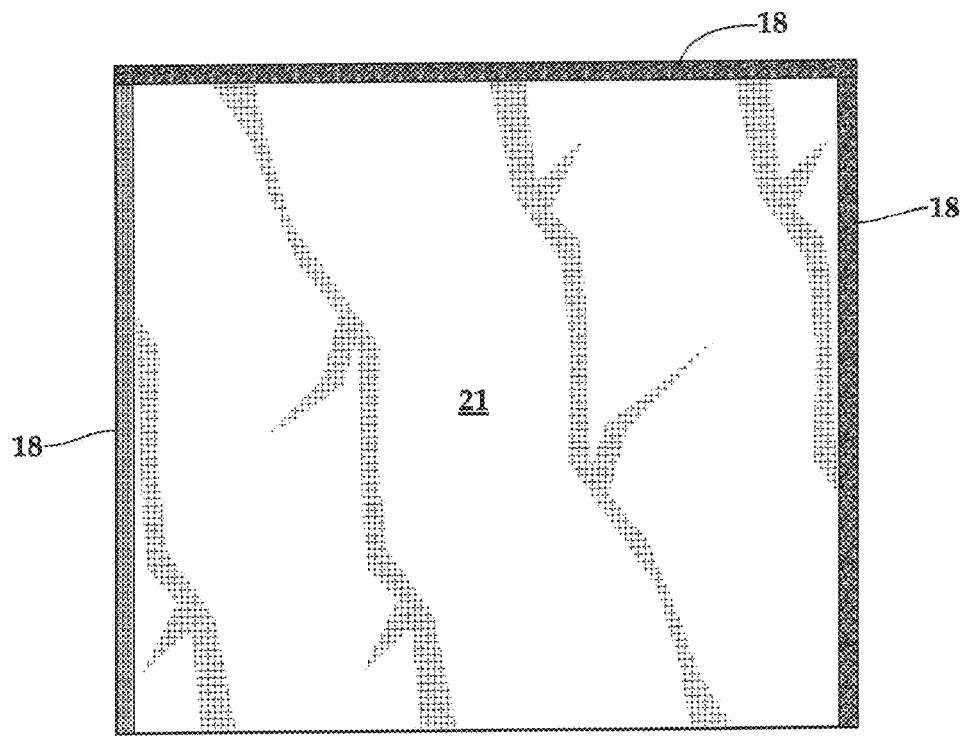
FIG. 22 is an outside view of the right side wall of the present invention.
Figure 23:
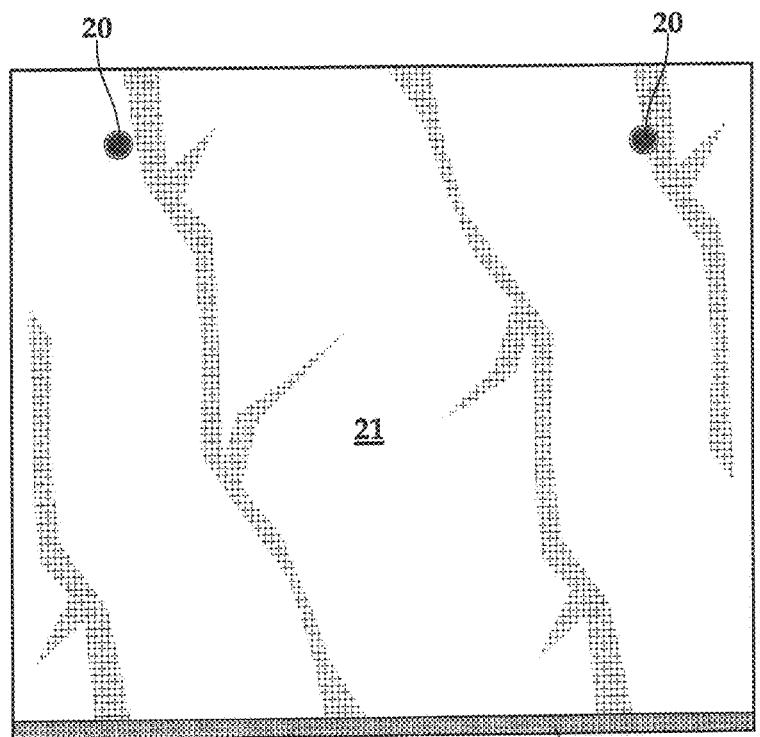
FIG. 23 is an inside view of the right side wall of the present invention.

FIG. 22 is an outside view of the right side wall of the present invention, and FIG. 23 is an inside view of the right side wall of the present invention. This is the side wall that corresponds to the view shown in FIG. 14. FIG. 22 shows the strips of hook-and-loop fastener 18 that extend across the top edge and along the side edges of the interior of the second side wall 21 and are used to secure the second side wall to the front and rear walls 8, 19 and the roof panel (see FIG. 25). FIG. 21 shows the strip of hook-and-loop fastener 18 that extends across the bottom of the outside of the second side wall 5 and is used to secure the second side wall 19 to the floor (see FIG. 26). The second side wall 5 comprises two air vents 20 that are situated at the top of the second side wall and spaced apart so that one air vent 20 is located on the right-hand side of the second side wall, and the other air vent 20 is located on the left-hand side of the second side wall. The right and left side walls 5, 21 are made of the same material and interior insulation as the front wall.

Figure 24:
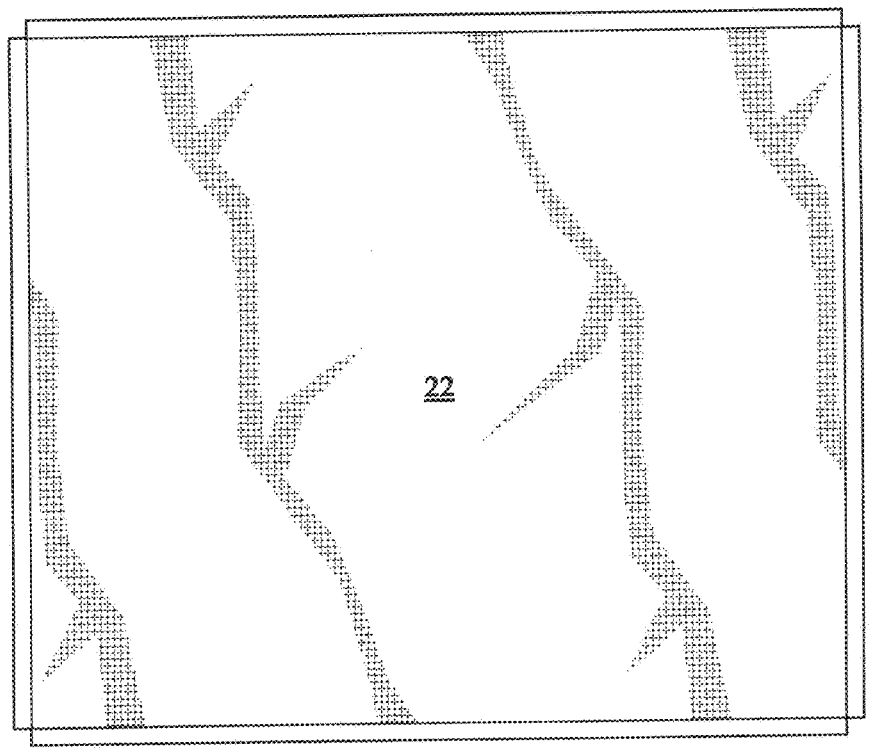
FIG. 24 is an outside view of the roof panel of the present invention.

FIG. 24 is an outside view of the roof panel of the present invention, and FIG. 25 is an inside view of the roof panel of the present invention. The roof panel 22 is made of the same material and interior insulation as the front wall. FIG. 25 shows the strips of hook-and-loop fastener 18 that are affixed to and extend around the perimeter of the roof panel 22 and are used to secure the roof panel to the front wall 8, rear wall 19, first side wall 5, and second side wall 21. The roof panel 22 also comprises two air vents 20, as described above.

Figure 26:
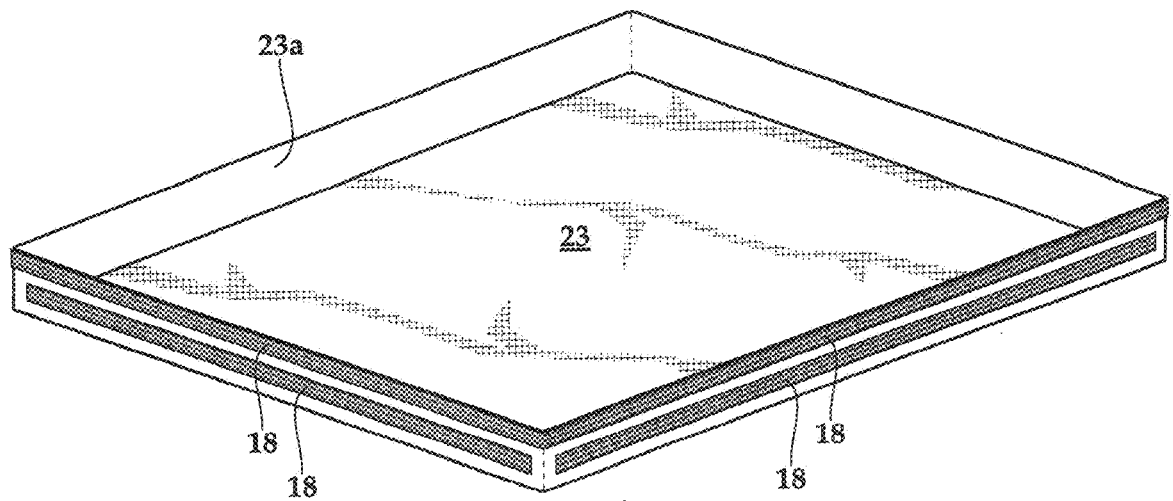
FIG. 26 is perspective view of the floor of the present invention.

FIG. 26 is a perspective view of the floor of the present invention. The floor 23 is made of the same material and interior insulation as the front wall. The floor comprises a lip 23a that extends around the entire perimeter of the floor and is perpendicular to the rest of the floor. This lip 23a comprises two strips of hook-and-loop fastener 18. These two strips of hook-and-loop fastener 18 are parallel to each other and extend along the outer face of the lip 23a, as shown. The upper strip is used to secure the floor 23 to the front, rear and side walls. The lower strip is used to connect the floor bumpers 13 to the floor 23 (see FIG. 28).

Figure 27:
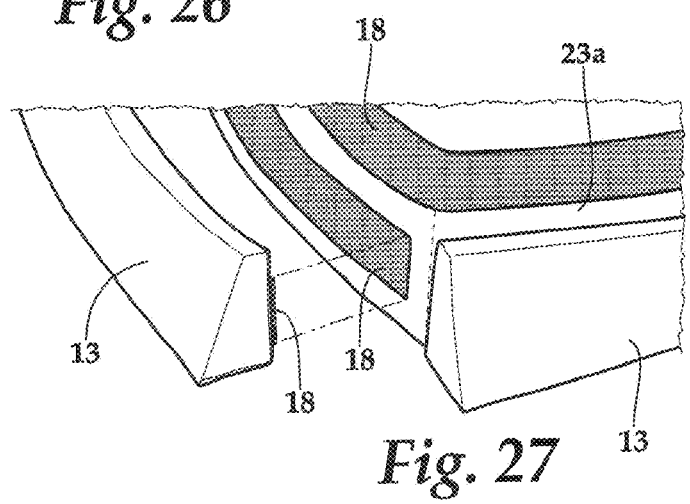
FIG. 27 is a detail view of the floor bumper shown in relation to the floor of the present invention.

FIG. 27 is a detail view of the floor bumper shown in relation to the floor of the present invention. In a preferred embodiment, there are four floor bumpers 13, one each for the front, back and two sides of the floor 23. As shown in this figure, the floor bumper 13 is preferably comprised of a downwardly sloping outer edge and a straight vertical interior edge that is affixed to the lip 23a of the floor via a hook-and-loop fastener 18. Note that the floor 23 does not contain air vents so as not to allow moisture to accumulate within the floor. The floor bumpers 13 also prop up the floor 23 to help contain fluids.

Figure 28:
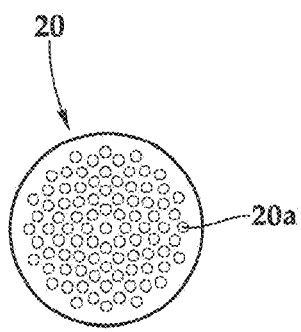
FIG. 28 is a detail view of an air vent of the present invention.

FIG. 28 is a detail view of an air vent of the present invention. As shown in this figure, the air vent 20 is preferably circular and comprised of a perforated face 20a.

Figure 29:
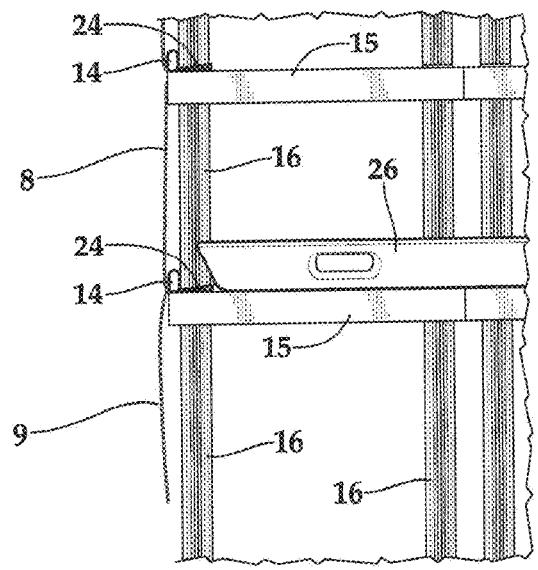
FIG. 29 is a detail side view of the front wall shown in relation to the horizontal shelving of the present invention.

FIG. 29 is a detail side view of the front wall shown in relation to the horizontal shelving of the present invention. In a preferred embodiment, the invention further comprises optional loops 24 that are preferably made of nylon webbing and hook-and-loop fasteners that extend from the bottom edge of the overhanging flap 14 and are configured to further secure the front wall 8 to the legs 16 at the front of the inner structure.

FIG. 30 is a perspective view of the stacker of the present invention, FIG. 31 is a top view of the stacker of the present invention, and FIG. 32 is a bottom view of the stacker of the present invention. As shown in these three figures, the stacker 25 is comprised of a circular flat plate 25a, a radial array 25b that is situated on one side of the circular flat plate 25a, and two U-shaped channels 25c that are situated on the other side of the circular plate 25a. The U-shaped channels 25c are configured to press fit into the first receptacles 15a, and the radial array 25b is configured to press fit into a leg 16. The legs 16 are then press fit into the second receptacles 15b, as noted above.

FIG. 33 is a top view of the body tray of the present invention, and FIG. 34 is a bottom view of the body tray of the present invention. The present invention includes a body tray 26. The body tray 26 has an angled perimeter wall 26a with slots 26b that can be used to grasp or lift the body tray. The body tray further comprises a plurality of longitudinal channels 26c that serve to prevent moisture accumulation on the underside of the body tray.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:
1. A refrigerated portable room system comprising:
 (a) a refrigerated room;
 (b) an air conditioning unit;
 (c) an insulated supply hose;
 (d) an insulated exhaust hose; and
 (e) a plurality of bumpers that are situated around a perimeter of a floor panel of the refrigerated room;
 wherein the air conditioning unit is configured to supply cooled air to the refrigerated room, to receive air from the refrigerated room, to cool the air that is received from the refrigerated room, and to return the cooled air to the refrigerated room in a closed loop;
 wherein the insulated supply hose is connected to a first side wall of the refrigerated room via a first flange;
 wherein the insulated exhaust hose is connected to the first side wall of the refrigerated room via a second flange;
 wherein the refrigerated room is sealed as to an exterior environment so as to contain the cooled air within the refrigerated room;
 wherein the refrigerated room comprises a front wall that is comprised of two layers of a vinyl-coated polyester material with a continuous filament insulation batting contained between them;
 wherein the inner structure is comprised of two or more modules, each module being comprised of a plurality of vertically aligned horizontal shelves that are connected by stackers and legs to form horizontal levels, each stacker being configured to fit within a receptacle in the horizontal shelves and to fit within one end of a leg;
 wherein the horizontal shelves of the modules in the inner structure are aligned so as to form longitudinally oriented compartments;
 wherein the front wall comprises a front flap corresponding to each horizontal level of the inner structure;
 wherein each front flap has a bottom horizontal edge and an arc-shaped upwardly extending perimeter that is formed by a zipper;
 wherein a front surface of each front flap comprises one or more windows, each window being comprised of transparent plastic and configured to receive documents; and wherein the number of windows on each front flap corresponds to the number of longitudinally oriented compartments.

2. The refrigerated portable room system of claim 1, wherein the first flange is situated at a top of the first side wall, and the second flange is situated at a bottom of the first side wall.

3. The refrigerated portable room system of claim 1, wherein an inside of each front flap comprises an overhanging flap that is configured to rest on top of an along a front edge of a horizontal shelf; and
   wherein the overhanging flap is situated on a back side of the bottom horizontal edge of the front flap.

4. The refrigerated portable room system of claim 1, wherein each of the two or more modules is configured to receive either caster wheels or legs underneath a bottommost level of the horizontal shelves.

5. The refrigerated portable room system of claim 1, wherein one of the horizontal levels is taller than the other horizontal levels within the inner structure.

6. The refrigerated portable room system of claim 1, wherein the refrigerated room further comprises a roof panel, a second side wall, and a rear wall; and
   wherein all of the front wall, the rear wall, the first and second side walls, the floor panel and the roof panel and connected to one another with hook-and-loop fasteners.

7. The refrigerated portable room system of claim 6, wherein the rear wall, the first and second side walls, the floor panel and the roof panel are all comprised of two layers of a vinyl-coated polyester material with a continuous filament insulation batting contained between them.

8. The refrigerated portable room system of claim 7, wherein an inside layer of the rear wall comprises two air vents that are spaced apart from one another and situated at a top of the rear wall.

9. The refrigerated portable room system of claim 7, wherein an inside layer of the first side wall comprises two air vents that are spaced apart from one another and situated at a top of the first side wall.

10. The refrigerated portable room system of claim 7, wherein an inside layer of the second side wall comprises two air vents that are spaced apart and situated at a top of the second side wall.

11. The refrigerated portable room system of claim 7, wherein an inside layer of the roof panel comprises two air vents that are spaced apart from one another.

12. The refrigerated portable room system of claim 6, wherein the floor panel comprises a lip that extends around the perimeter of and is perpendicular to the floor panel;
    wherein the lip is configured to connect the floor panel to the front wall, the rear wall, and the first and second side walls; and
    wherein the lip is configured to attach the floor panel to the bumpers.

13. The refrigerated portable room system of claim 1, wherein each bumper is comprised of a downwardly sloping outer edge and a straight vertical interior edge.

14. The refrigerated portable room system of claim 3, further comprising loops that extend from a bottom edge of the overhanging flap and are configured to secure the front wall to the legs that are situated at a front of the inner structure.

15. The refrigerated portable room system of claim 1, wherein each stacker is comprised of a circular flat plate, a radial array that is situated on a first side of the circular flat plate, and two U-shaped channels that are situated on a second side of the circular plate; and
    wherein the U-shaped channels are configured to press fit into the receptacles in the horizontal shelves, and the radial array is configured to press fit into a leg.

16. The refrigerated portable room system of claim 1, further comprising a plurality of body trays;
    wherein each body tray has an angled perimeter wall with slots that are configured to serve as handles for grasping or lifting the body tray; and
    wherein each body tray further comprises a plurality of longitudinal channels on an underside of the body tray.

* * * * *